(12) United States Patent
Drake

(10) Patent No.: US 9,074,636 B2
(45) Date of Patent: Jul. 7, 2015

(54) CLUTCH ASSEMBLY

(71) Applicant: Daniel Vernon Drake, Wichita, KS (US)

(72) Inventor: Daniel Vernon Drake, Wichita, KS (US)

(73) Assignee: MoJack Distributors, LLC, Wichita, KS (US)

( * ) Notice: Subject to any disclaimer, the term of this patent is extended or adjusted under 35 U.S.C. 154(b) by 218 days.

(21) Appl. No.: 13/758,533

(22) Filed: Feb. 4, 2013

(65) Prior Publication Data

US 2014/0221104 A1     Aug. 7, 2014

(51) Int. Cl.
*B66D 1/14*     (2006.01)
*F16D 9/06*     (2006.01)
*B60S 9/08*     (2006.01)

(52) U.S. Cl.
CPC ..... *F16D 9/06* (2013.01); *B60S 9/08* (2013.01)

(58) Field of Classification Search
USPC .......................................... 254/346; 192/69.9
See application file for complete search history.

(56) References Cited

U.S. PATENT DOCUMENTS

| | | | | |
|---|---|---|---|---|
| 2,624,549 | A | * | 1/1953 | Wallace ........................... 464/18 |
| 2,665,788 | A | * | 1/1954 | Hughes ....................... 192/12 R |
| 3,215,402 | A | | 11/1965 | Hott |
| 3,542,178 | A | * | 11/1970 | Ripple ........................... 192/69.9 |
| 4,427,094 | A | | 1/1984 | Winkelblech |
| 4,593,883 | A | | 6/1986 | Nelson |
| 4,984,657 | A | | 1/1991 | Burns |
| 5,174,414 | A | | 12/1992 | Burns |
| 5,362,196 | A | | 11/1994 | Beattie |
| 5,904,310 | A | * | 5/1999 | Miyazaki ...................... 242/260 |
| 5,988,974 | A | | 11/1999 | Zackovich |
| 6,062,363 | A | * | 5/2000 | Cline ........................... 192/69.9 |
| 6,435,309 | B1 | | 8/2002 | Hultqvist |
| 6,439,346 | B1 | | 8/2002 | Gradziuk |
| 6,745,882 | B2 | * | 6/2004 | Ai ................................. 192/48.8 |
| 6,966,540 | B2 | | 11/2005 | Falk |
| 7,975,796 | B2 | * | 7/2011 | Guo .............................. 180/247 |
| 8,113,328 | B2 | * | 2/2012 | Harrison et al. ............. 192/69.9 |
| 2003/0121747 | A1 | * | 7/2003 | Ai .............................. 192/69.91 |

FOREIGN PATENT DOCUMENTS

| | | |
|---|---|---|
| CH | 526463 | 8/1972 |
| FR | 2781779 | 2/2000 |
| WO | WO9626886 | 9/1996 |

OTHER PUBLICATIONS

Safety Standard for Portable Automotive Lifting Devices, The American Society of Mechanical Engineers, New York, NY, May 31, 2006, 78 pages.
Omega Motorcycle /ATV Lift, Model No. 49154, SFA Companies, Kansas City, MO 2002, 8 pgs.

* cited by examiner

*Primary Examiner* — Emmanuel M Marcelo
(74) *Attorney, Agent, or Firm* — Spencer Fane Britt & Browne LLP

(57) ABSTRACT

A clutch assembly for connecting a drive member or a driven member to a shaft. The clutch assembly includes a tubular cup assembly that interfaces with a tubular receiver. The cup nests within the receiver, and they are secured by screws. The shaft is received within the cup whereby a non-circular element connected to the end of the shaft is received within a chamber having a non-circular interior sidewall. The receiver is connected to a drive member or a driven member. When a component connected to an end of the clutch assembly ceases to rotate, and a component connected to the opposite end of the clutch assembly continues to rotate, the clutch will prevent damage to either component by failing.

28 Claims, 31 Drawing Sheets

CLUTCH ASSEMBLY

BACKGROUND OF THE INVENTION

Rotation of a shaft may be used to transfer rotational energy from a drive member to a driven member, such as rotation of a rod to extend and retract a window awning. The shaft may be rotated by a hand-operated drive member or a mechanical drive member. In some applications movement of the driven member is necessarily limited, and rotation of the shaft beyond a certain point may damage the shaft, the drive member, or the driven member.

BRIEF SUMMARY OF THE INVENTION

In general, an aspect of the disclosed subject matter includes a clutch assembly for connecting a drive member or a driven member to a shaft wherein under predetermined conditions the clutch assembly fails prior to damage to the drive member, driven member, or the element connected to the opposite end of the shaft.

The clutch assembly includes a cup assembly received within a receiver assembly. The cup includes a generally tubular upwardly-open chamber having a generally circular exterior sidewall with opposing exterior flat sides, and a passage in a bottom wall extending between the interior of the cup and the exterior of the cup. The receiver includes a generally tubular downwardly-open chamber having a generally circular interior sidewall with opposing interior flat sides. The cup and the receiver are nested together whereby the cup flat exterior sidewalls engage the receiver flat interior sidewalls. Screws extending through the receiver sidewall into the cup sidewall hold the two assemblies together.

The shaft is received within the cap bottom wall passage. The cup includes a non-circular interior sidewall adapted to receive a non-circular element connected to an end of the shaft, such as a threaded member or nut. A biasing member, including a spring, is compressed between the receiver and the cup. A driven member or a drive member is operably connected to the receiver. In an embodiment, the drive member is a handle adapted to rotate the clutch assembly.

In an embodiment the cup assembly is manufactured from a material softer than the threaded fastener. When the shaft encounters a condition whereby the shaft is prevented from rotating but the receiver may be rotated, further rotation of the clutch assembly about the shaft causes the threaded fastener to remain stationary as the threaded fastener rotates within the cup thereby rounding the interior sidewall and preventing rotation of the rod. Alternatively, the receiver may be prevented from rotating and the rod may be permitted to rotate resulting in the cup remaining stationary as the threaded fastener rotates within the cup thereby rounding the interior sidewall and preventing rotation of the receiver. Sacrificing the cup assembly in such a condition avoids damage to the drive member, the driven member, or the mechanism connected to the opposite end of the shaft.

In another embodiment the cup is manufactured from a softer material than the screws, and further rotation of the clutch assembly about the shaft causes the cup to remain stationary as the screws rotate with the receiver assembly. Alternatively, the receiver may be prevented from rotating and the rod may be permitted to rotate resulting in the receiver remaining stationary as the cup rotates within the receiver.

In another embodiment the screws are manufactured from a softer material than the cup and the receiver, and further rotation of the receiver about the shaft causes the screws to shear as the receiver rotates about the cup. Alternatively, the receiver may be prevented from rotating and the rod may be permitted to rotate resulting in the shearing of the screws as the cup rotates within the receiver.

In an embodiment the rod is an elongated support member, and a threaded member is threadably received on the elongated support member, and the threaded member rotates relative to the threaded member thereby moving the threaded member along the elongated support member.

BRIEF DESCRIPTION OF THE SEVERAL VIEWS OF THE DRAWINGS

In the description below, reference will be made to the accompanying drawings, which are not necessarily drawn to scale. Like numbers refer to like elements throughout.

DETAILED DESCRIPTION OF THE INVENTION

Figure 1:
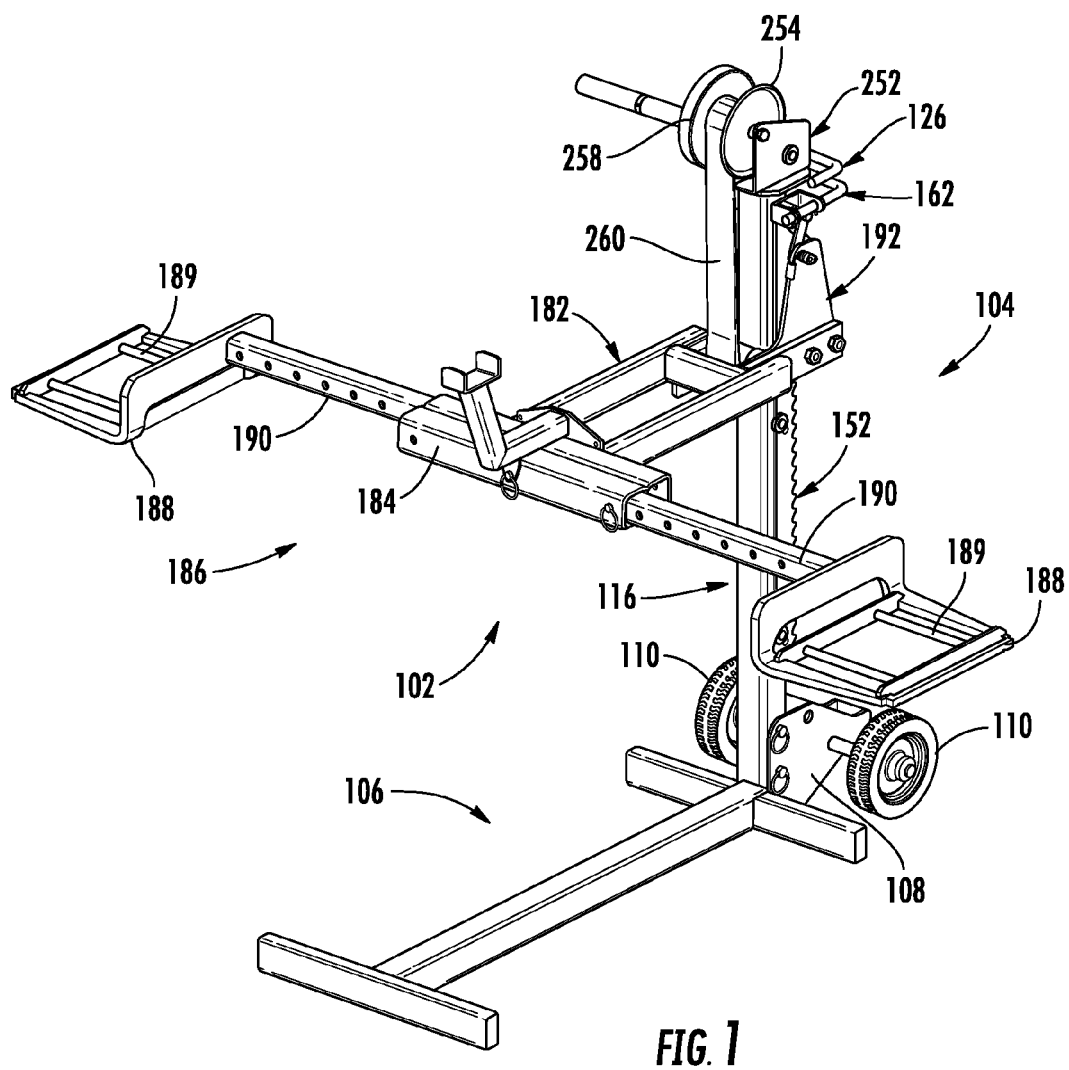
FIG. 1 is a perspective view of an improved vehicle jack according to a particular embodiment of the invention.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Structure and Assembly of Various Embodiments of the Disclosed Subject Matter

FIGS. 1-9 show a vehicle jack 102 embodying principles of the disclosed subject matter. In an embodiment, the vehicle jack 102 generally comprises a wheel support assembly 186 connected to a support frame assembly 104. In alternative embodiments, the wheel support assembly 186 is connected to the support frame assembly 104 by a lifting frame assembly 182. In various alternative embodiments, the support frame assembly 104 includes a lifting frame support assembly 116 mounted adjacent a base assembly 106, wherein the wheel support assembly 186 is mounted adjacent the lifting frame support assembly 116. The wheel support assembly 186 is selectively raised and selectively lowered by a lifting frame actuation mechanism 252.

Referring to FIG. 1, the wheel support assembly 186 is shown connected to the support frame assembly 104 by the lifting frame assembly 182. In various embodiments of the disclosed subject matter, the wheel support assembly 186 includes a pair of wheel supports 188 for engaging the wheels of a vehicle, with a wheel support mounting bar 190 extending between them. In various embodiments, the wheel supports 188 include a spaced apart wheel front support and wheel rear support. In the embodiment shown in FIG. 1, the spaced apart wheel supports are rollers 189.

In the embodiment shown in FIG. 1, the lifting frame assembly 182 includes a central support 184 for slidably attaching each wheel support 188 (e.g., in a telescoping arrangement). In particular embodiments, each wheel support mounting bar 190 includes an adjustment mechanism (e.g., a pin/hole arrangement such as the arrangement shown in FIG. 1) that is adapted: (1) for allowing a user to selectively adjust the lateral position of the wheel support mounting bar 190 (and, therefore, the corresponding wheel support 188 relative to the central support 184); and (2) selectively maintaining the wheel support mounting bar 190 in any of a plurality of desired lateral positions.

In the embodiment shown in FIG. 1, the lifting frame assembly 182 generally includes a ratchet assembly 192 for guiding the lifting frame assembly 182 along the support frame assembly 104. In various alternative embodiments, the support frame assembly 104 includes a lifting frame support assembly 116 mounted adjacent a base assembly 106, wherein the lifting frame assembly 182 is mounted adjacent the lifting frame support assembly 116.

The base assembly 106 shown in FIG. 1 includes a generally I-shaped member. The lifting frame support assembly 116 includes an elongated upright support that extends upwardly away from the base assembly 106 in a substantially vertical (e.g., vertical) orientation. In particular embodiments of the disclosed subject matter, a wheel bracket 108 is mounted to the vehicle jack 102 adjacent to the point at which the base assembly 106 attaches to the lifting frame support assembly 116. The wheel bracket 108 is adapted to support one or more wheels 110 that are used to facilitate the movement of the vehicle jack 102 along a support surface. In particular embodiments, the vehicle jack 102 also includes a jack handle assembly 126 to facilitate movement of the vehicle jack 102. In the embodiment shown in FIG. 1, the jack handle assembly 126 is mounted adjacent an upper (e.g., a second) end 124 of the lifting frame support assembly 116.

In various embodiments of the disclosed subject matter, the ratchet assembly 192 is attached adjacent (e.g., to) the lifting frame support assembly 116 to permit movement of the ratchet assembly 192 (and, therefore, the lifting frame assembly 182) along the length of the lifting frame support assembly 116. The vehicle jack 102, according to various embodiments of the disclosed subject matter, includes a lifting frame actuation mechanism 252 for moving the lifting frame assembly 182, and the ratchet assembly 192, upwardly relative to the lifting frame support assembly 116. In the embodiment depicted in FIG. 1, the lifting frame actuation mechanism 252 includes a winch assembly 254, described further below, mounted adjacent (e.g., to) an upper end of the lifting frame support assembly 116. In various embodiments, the winch assembly 254 is automatically driven (e.g., via an electric motor). However, in the embodiment shown in FIG. 1, the winch assembly 254 is driven manually, via a hand crank.

The depicted winch assembly 254 further includes a brake winch 258 and a winch belt 260. In various embodiments of the disclosed subject matter, a lower (e.g., a first) end of the winch belt 260 is attached adjacent (e.g., to) the ratchet assembly 192 and an upper (e.g., a second) end of the winch belt 260 is attached adjacent (e.g., to) the brake winch 258. Turning the brake winch 258 in a take-up direction winds the winch belt 260 about a take-up spool associated with the brake winch 258. This causes the winch belt 260 to move the ratchet assembly 192 upwardly along a length of the lifting frame support assembly 116. Similarly, turning the brake winch 258 in a belt release direction (which may be, for example, opposite to the take-up direction), causes the lower end of the winch belt 260 to pay out (e.g., unwind) from the brake winch 258 take up spool. This, in turn, causes the ratchet assembly 192 to move downwardly along the length of the lifting frame support assembly 116. In various other embodiments (not shown), the winch assembly 254 includes a chain or other elongated, flexible, connecting member instead of the winch belt 260 shown in FIG. 1.

Referring to FIGS. 1-3B, particular embodiments of the vehicle jack 102 include at least one toothed rack assembly 152 mounted adjacent (e.g., to) the lifting frame support assembly 116. In the embodiment shown, the toothed rack assembly 152 includes two toothed bars 154 (shown in FIG. 2) that are spaced apart from each other. However, in alternative embodiments, the toothed rack assembly 152 may include any other suitable rack structure, including those with less or more than two toothed bars 154. In the embodiment shown in FIG. 2, each toothed bar 154 includes a lower (e.g., a first) end 156 and an upper (e.g., a second) end 158 and is mounted in a substantially vertical (e.g., vertical) orientation adjacent (e.g., to) a respective side surface 148 of the lifting frame support assembly 116. Further, each toothed bar 154, according to a particular embodiment of the disclosed subject matter, defines a plurality of ratchet teeth 166 that extend outwardly from a rear edge of the toothed bar 154 (see FIG. 2). At least a portion of the plurality of ratchet teeth 166 of one of the toothed bars 154 is substantially horizontally aligned with at least a portion of the plurality of ratchet teeth 166 of the other toothed bar 154.

Figure 2:
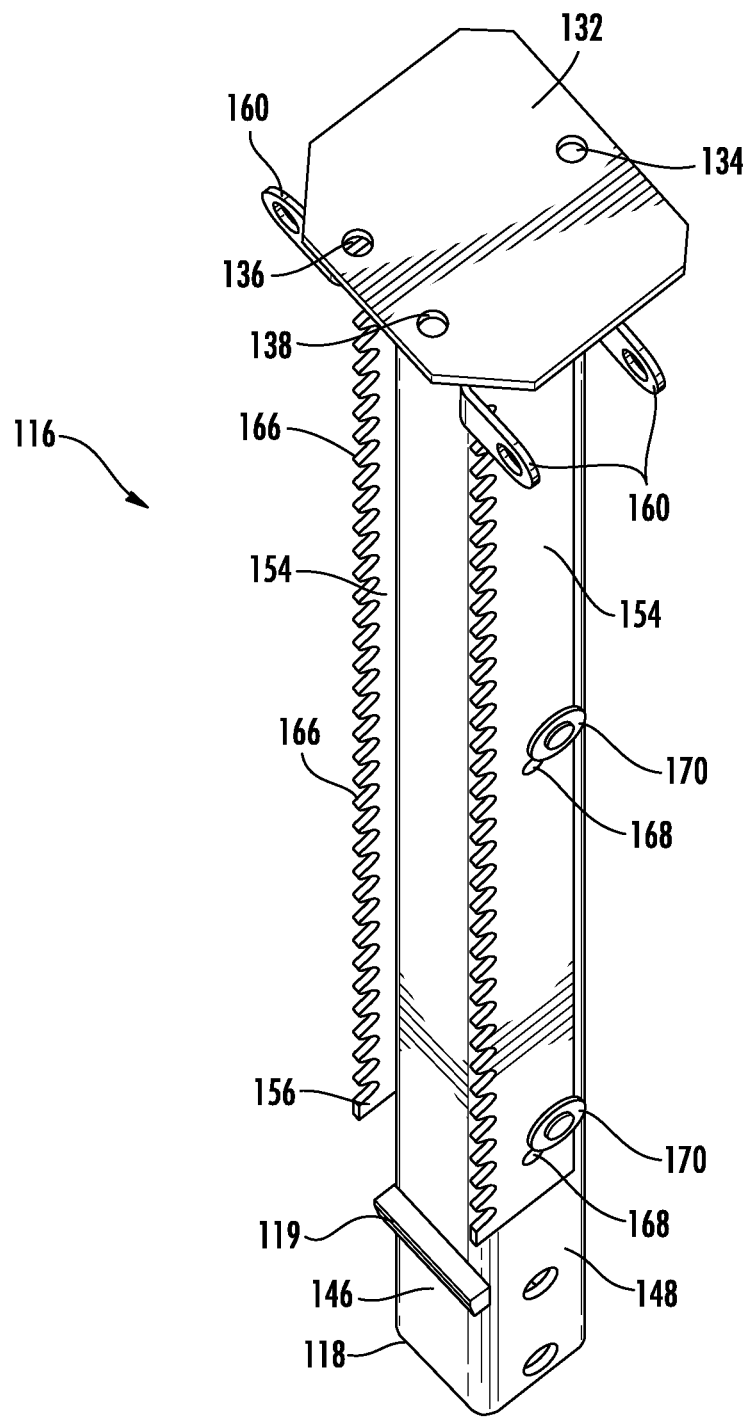
FIG. 2 is a perspective view of a lifting frame support assembly of the vehicle jack of FIG. 1.
Figure 3A:
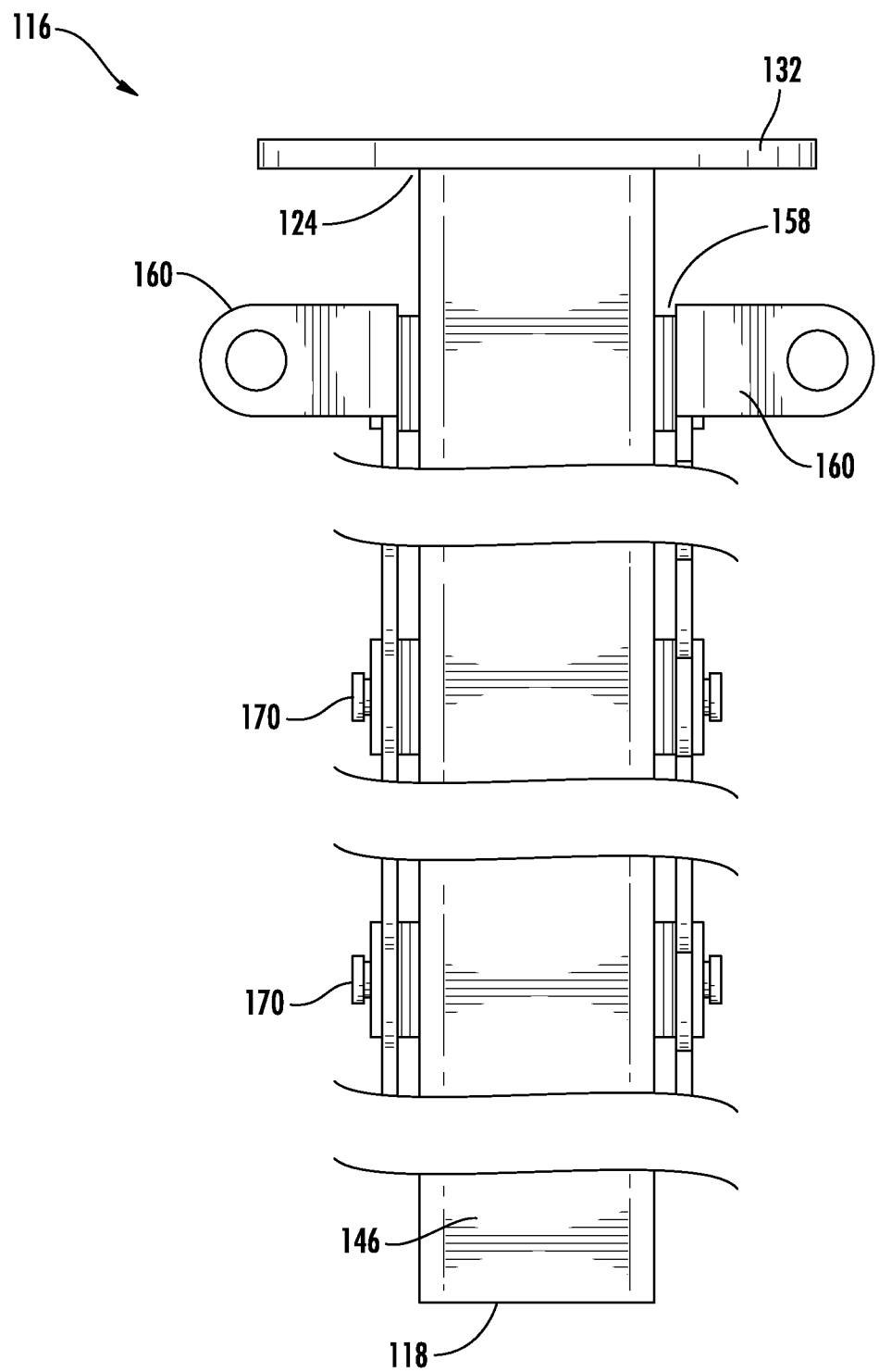
FIG. 3A is a front view of the lifting frame support assembly of FIG. 2.
Figure 3B:
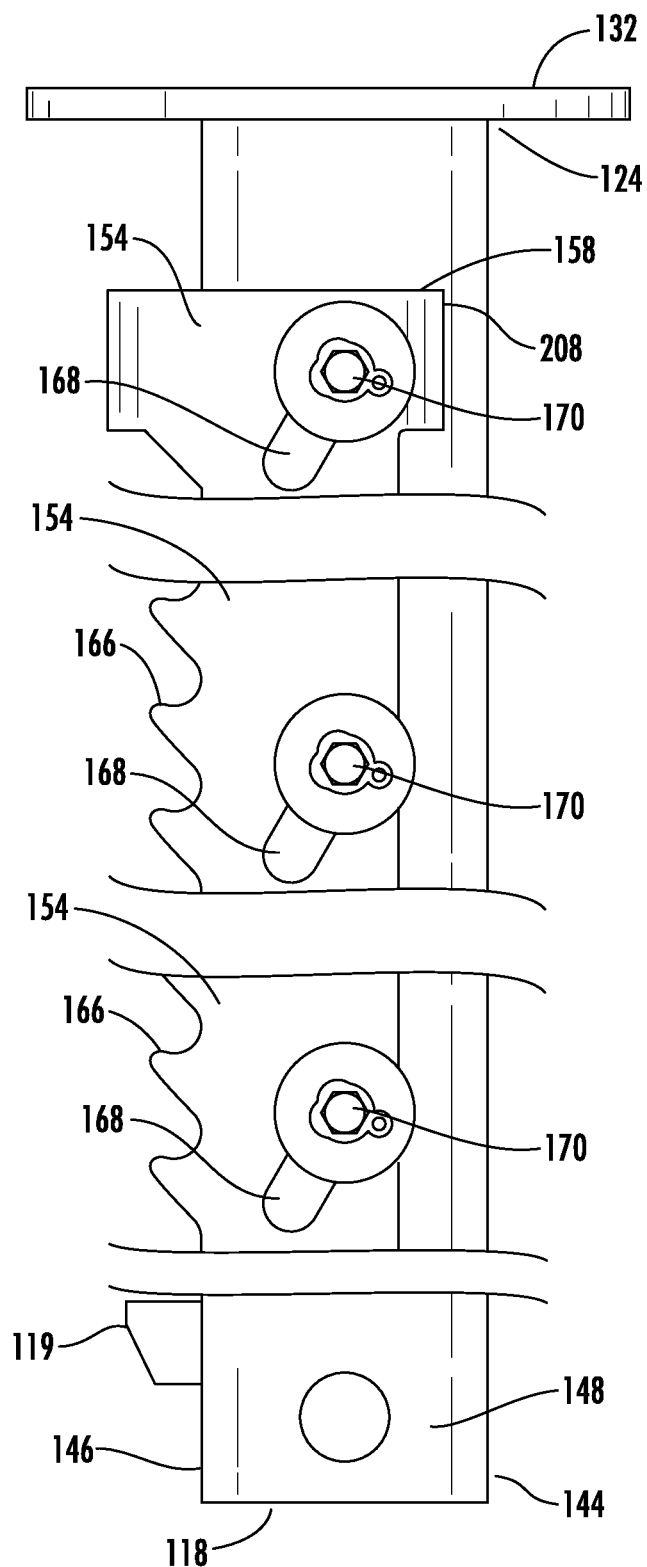
FIG. 3B is a side view of the lifting frame support assembly of FIG. 2.

As may be understood from FIG. 2, in various embodiments of the disclosed subject matter, each toothed bar 154 defines at least two elongated, angled pin slots 168 designed to slidably receive a corresponding toothed bar mounting pin 170 (see also FIG. 3B). Each angled pin slot 168 is disposed between the rear edge of the toothed bar 154 and a front edge of the toothed bar 154 (which is opposite and spaced apart from the rear edge) such that an upper end of each slot 168 is disposed adjacent the front edge of the toothed bar 154 and a lower end of each pin slot 168 is disposed adjacent the rear edge of the toothed bar 154. In various embodiments of the invention, the respective toothed bar mounting pins 170 mount each toothed bar 154 to a respective one of the lifting frame support assembly 116 side surfaces 148. In alternative embodiments (not shown), the slots may have an alternative shape and/or orientation to that shown in FIG. 2, such as, for example, a substantially L-shaped or substantially horizontal.

In a particular embodiment of the disclosed subject matter, the lifting frame support assembly 116 includes a top plate 132 mounted adjacent (e.g., to) a second end 124 of the lifting frame support assembly 116. The top plate 132 includes a first opening 134 that may be used to receive a fastener for mounting the winch assembly 254 to the upright lifting frame support assembly 116. In various embodiments of the disclosed subject matter, the top plate 132 further includes a second opening 136 and a third opening 138 that may receive additional fasteners for mounting the jack handle assembly 126 to the lifting frame support assembly 116. As may be understood from FIG. 7, in a particular embodiment of the disclosed subject matter, the jack handle assembly 126 may include two arms 128 and a mounting plate 130 that extends between the arms 128. In a particular embodiment, the mounting plate 130 may be adapted to be attached adjacent a top surface of the top plate 132, as shown generally in FIG. 5, using one or more fasteners (e.g., bolts, screws, adhesive, clip, and/or other suitable fasteners).

Figure 4:
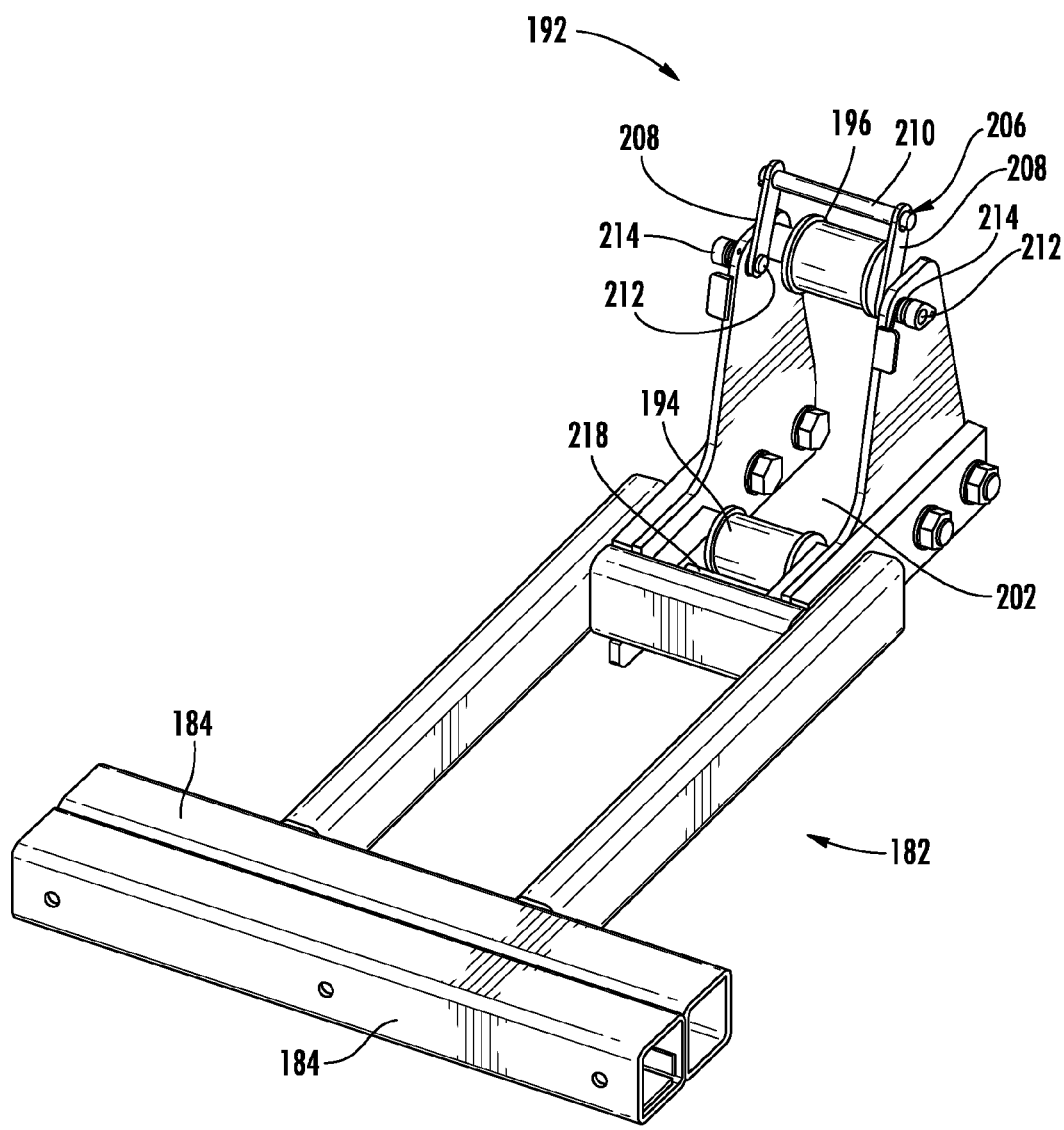
FIG. 4 is a perspective view of an embodiment of a lifting frame assembly of the vehicle jack of FIG. 1.

As maybe understood from FIG. 4, the ratchet assembly 192, according to a particular embodiment of the disclosed subject matter, includes at least a first roller 194 and a second roller 196. In various embodiments of the disclosed subject matter, the first roller 194 is positioned adjacent a front surface 144 of the lifting frame support assembly 116, and the second roller 196 is positioned adjacent a rear surface 146 of the lifting frame support assembly 116 (see FIGS. 1 and 4). A first channel 202 is defined between the first roller 194 and second roller 196, and the lifting frame support assembly 116 extends through the first channel 202.

Figure 5:
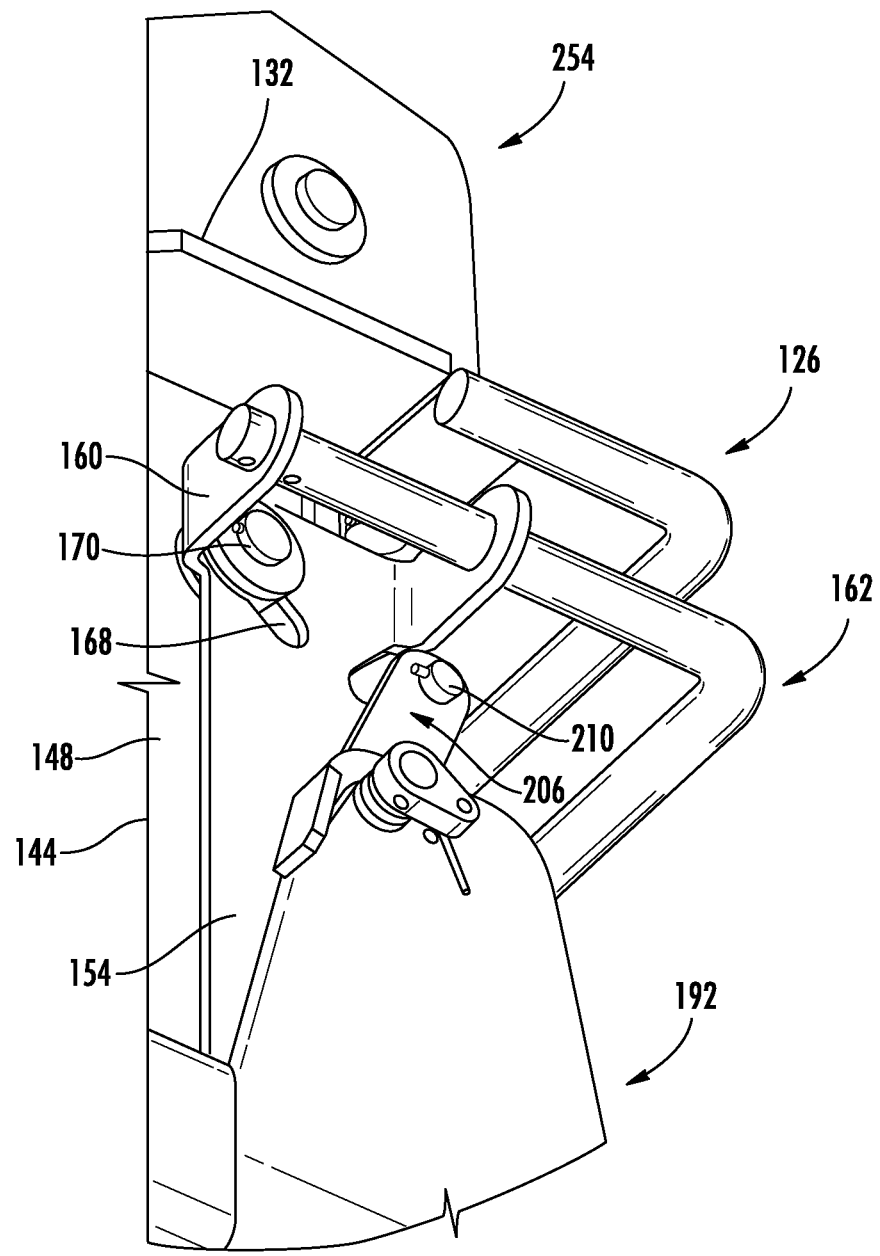
FIG. 5 is a perspective view of a safety stop release mechanism of the vehicle jack of FIG. 1.
Figure 6:
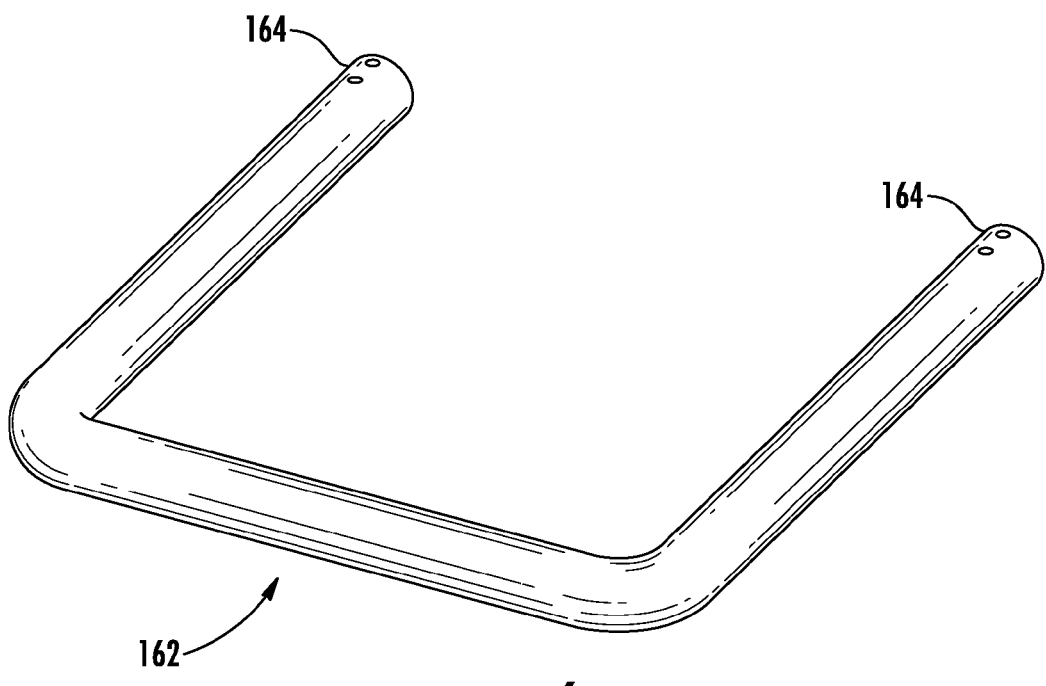
FIG. 6 is a perspective view of a release handle assembly of the vehicle jack of FIG. 1.
Figure 7:
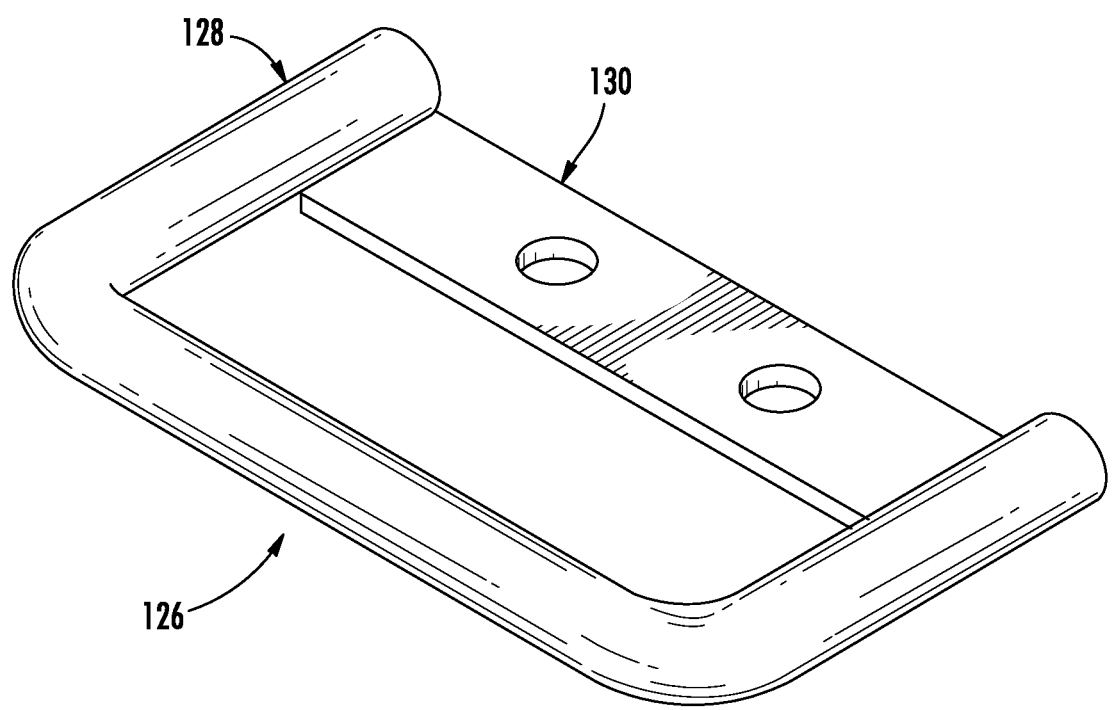
FIG. 7 is a perspective view of a jack handle assembly of the vehicle jack of FIG. 1.

The ratchet assembly 192, according to various embodiments of the disclosed subject matter, also includes a torque arm assembly 206 and a toothed bar engagement pin 210 (see FIGS. 4 and 5). In various embodiments of the disclosed subject matter, as described in greater detail below, the torque arm assembly 206 urges the toothed bar engagement pin 210 toward one of the plurality of troughs between the toothed rack assembly 152 ratchet teeth 166 (see FIG. 3B) as the winch assembly 254 moves the ratchet assembly 192 vertically relative to the lifting frame support assembly 116. In a particular embodiment of the disclosed subject matter, the vertical movement of the ratchet assembly 192 is physically limited between the lower end 156 of the toothed bar 154 and the upper end 158 of the toothed bar 154 (see FIGS. 2 and 3A). In an alternative embodiment of the disclosed subject matter, the vertical movement of the ratchet assembly 192 is physically limited between the horizontal bar 119 and the upper end 158 of the toothed bar 154 (see FIG. 3B). As described in more detail below, in various embodiments, urging the toothed bar engagement pin 210 into a trough between the toothed rack assembly 152 ratchet teeth 166 prevents inadvertent vertical movement of the ratchet assembly 192 relative to the toothed rack assembly 152 (see FIG. 2).

In the embodiment shown in FIG. 4, the torque arm assembly 206 includes two arms 208 that extend substantially upwardly from a rear side of the ratchet assembly 192 adjacent the second roller 196. A pin 212 or other suitable fastener couples a lower portion of each arm 208 to the ratchet assembly 192, and the toothed bar engagement pin 210 extends between upper portions of the two arms 208. A torsion spring 214 is disposed around each of the pins 212 to bias the arms 208 in a direction away from the rear side of the ratchet assembly 192.

In the embodiment shown in FIG. 4, the ratchet assembly 192 includes a winch belt pin 218 that attaches the lower end of the winch belt 260 to the lifting frame assembly 182. In this embodiment, turning the brake winch 258 in a belt take-up direction winds the upper portion of the winch belt 260 about the brake winch 258 take-up spool. This, in turn, lifts the winch belt pin 218 that, in turn, moves the ratchet assembly 192 and the lifting frame assembly 182 upwardly along a length of the lifting frame support assembly 116. In various embodiments of the disclosed subject matter, the movement of the winch belt pin 218 is limited by the upper end 158 of the toothed bar 154 and the lower end 156 of the toothed bar 154 (see FIG. 3B).

As may be understood from FIGS. 2 and 5, the toothed bar 154, according to a particular embodiment of the disclosed subject matter, includes at least two release handle mounting plates 160. In various embodiments, the release handle mounting plates 160 are positioned at the upper end 158 of the toothed bar 154. The release handle mounting plates 160 are adapted to receive and support a release handle assembly 162. In various embodiments of the disclosed subject matter, as may be understood from FIG. 6, the release handle assembly 162 contains at least two mounting holes 164 that are used to facilitate locking the release handle assembly 162 to the release handle mounting plates 160 (e.g., via one or more fasteners, such as hair pins).

As previously disclosed, the ratchet assembly 192, according to the embodiment shown in FIG. 4, includes at least a first roller 194 disposed adjacent a front surface 144 (shown in FIG. 3B) of the lifting frame support assembly 116 and a second roller 196 disposed adjacent a rear surface 146 (shown in FIG. 3B) of the lifting frame support assembly 116. As may be understood from FIGS. 8 and 9, a ratchet assembly 302, according to an alternative embodiment of the disclosed subject matter, further includes at least two side rollers 224 disposed on opposing and spaced apart sides of the first channel 202 defined between the first roller 194 and second roller 196. The side rollers 224 engage opposing and spaced apart side surfaces of the lifting frame support assembly 116 as the lifting frame support assembly 116 travels through the first channel 202.

Figure 8:
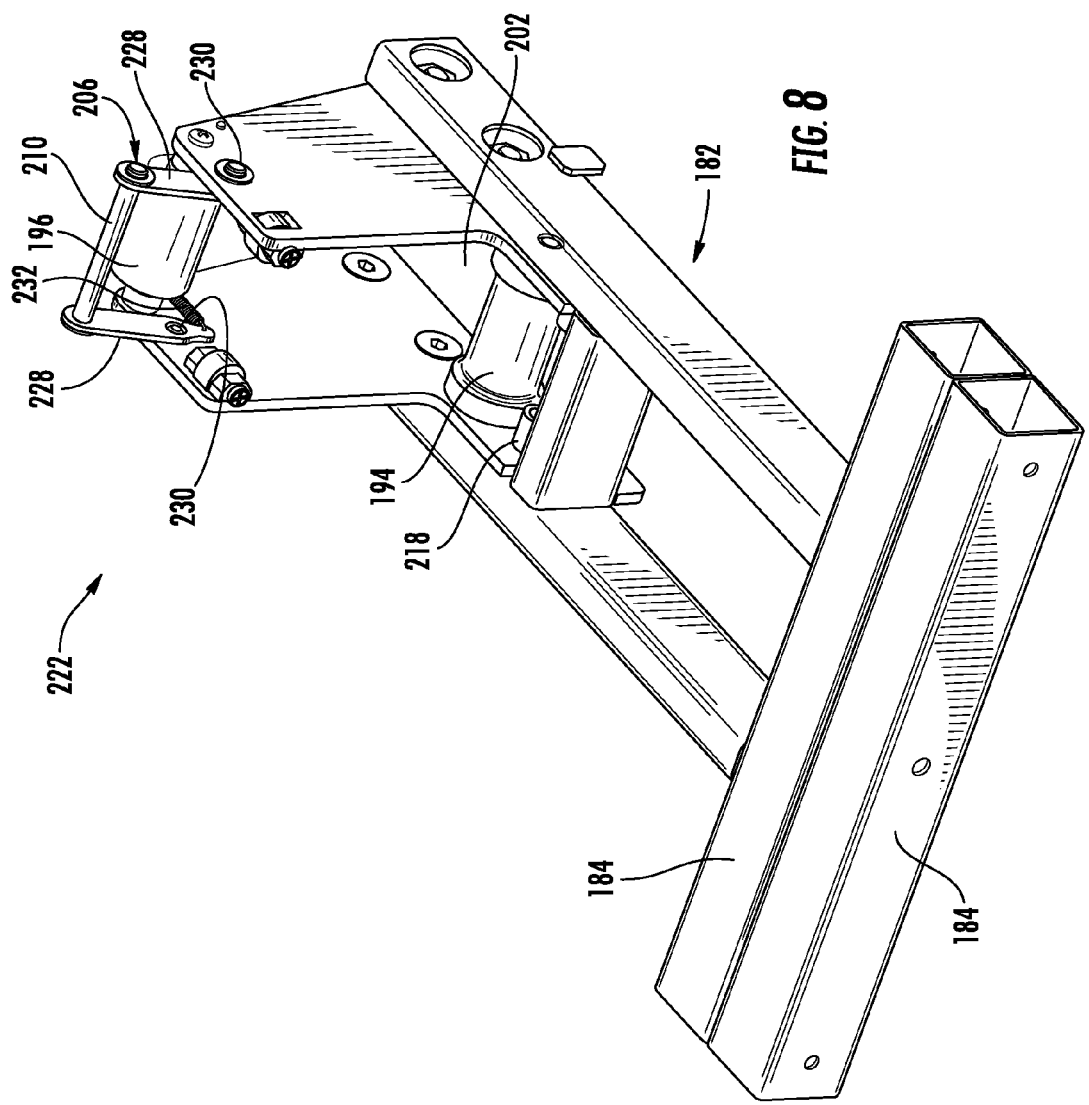
FIG. 8 is a perspective view of an alternative embodiment of a lifting frame assembly.
Figure 9:
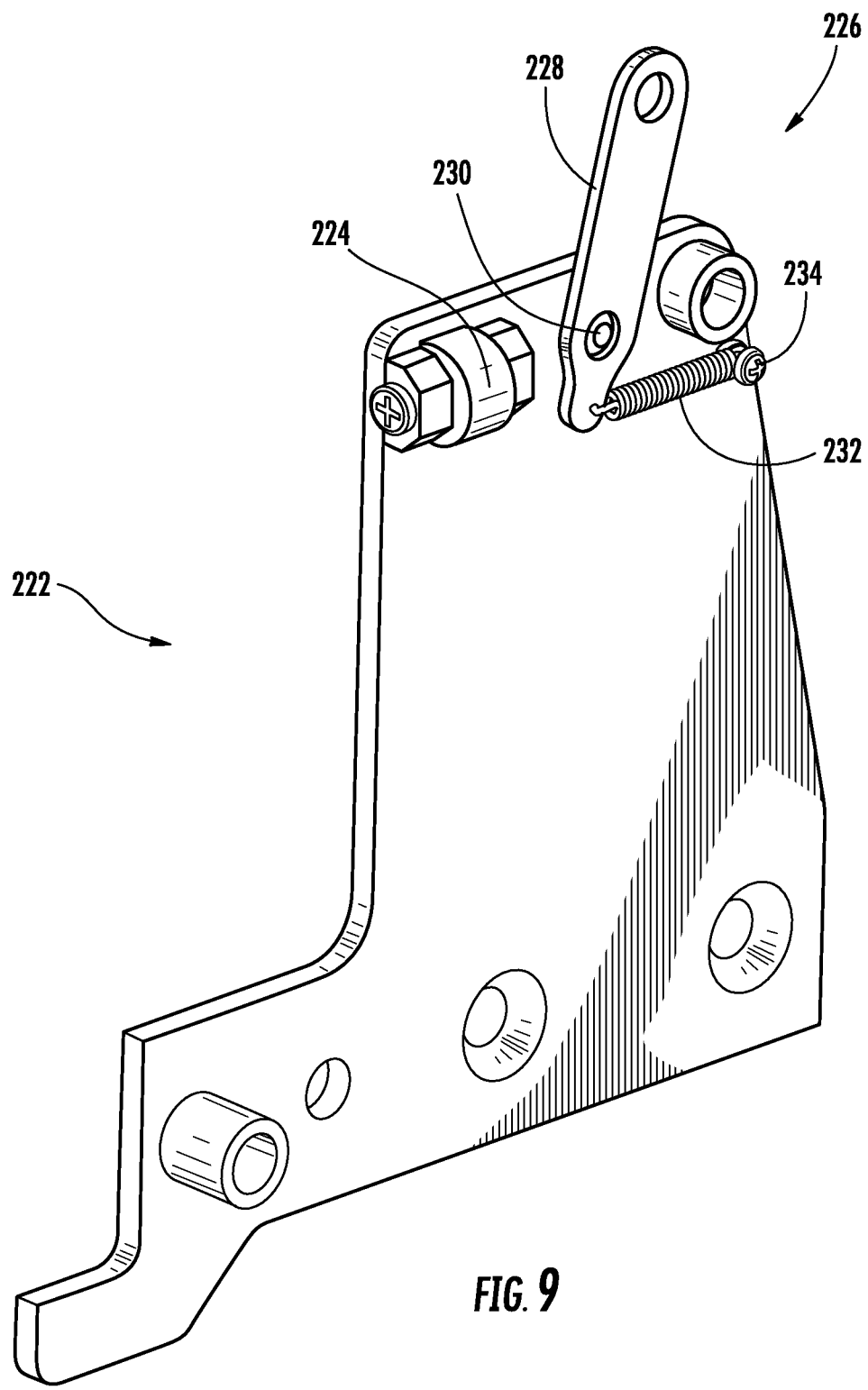
FIG. 9 is a perspective view of a ratchet assembly of the lifting frame assembly of FIG. 8.

FIGS. 8 and 9 also illustrate an alternative embodiment of a torque arm assembly 226 and the ratchet assembly 222. The torque arm assembly 226 includes two arms 228 that extend substantially upwardly from a rear side of the ratchet assembly 222 adjacent the second roller 196. A pin 230 or other suitable fastener couples a lower portion of each arm 228 to the ratchet assembly 222, and the toothed bar engagement pin 210 extends between upper portions of the two arms 228. One end of a helical spring 232 is attached to each of the pins 230 and an opposing end of the helical spring 232 is anchored with a screw 234 or other suitable fastener so as to bias the arms 228 in a direction away from the rear side of the ratchet assembly 222. In other various embodiments (not shown), the arms and/or the toothed bar engagement pin 210 are biased using other suitable biasing means, such as another type of spring or using materials for the arms and/or the toothed bar engagement pin 210 having an inherent resiliency.

Screw Driven Embodiment

FIGS. 10-17C show an alternative embodiment vehicle jack 302 embodying principles of the disclosed subject matter. In an embodiment, the vehicle jack 302 generally comprises a wheel support assembly 486 connected to a support frame assembly 304. In alternative embodiments, the wheel support assembly 486 is connected to the support frame assembly 304 by a lifting frame assembly 482. In various alternative embodiments, the support frame assembly 304 includes a lifting frame support assembly 316 mounted adjacent a base assembly 306, wherein the wheel support assembly 486 is mounted adjacent the lifting frame support assembly 316. The wheel support assembly 486 is selectively raised and selectively lowered by a lifting frame actuation mechanism 550.

Figure 10:
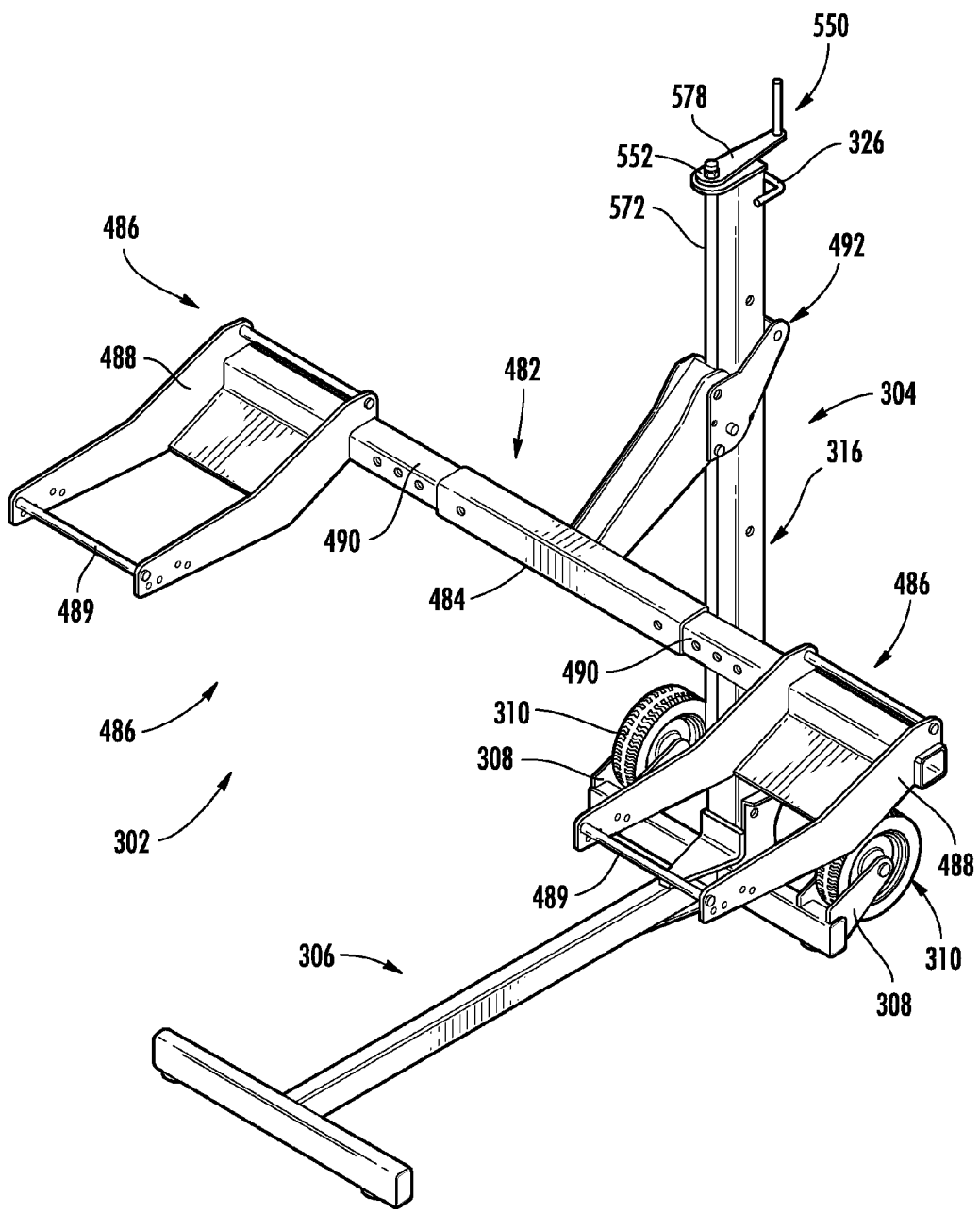
FIG. 10 is a perspective view of an improved vehicle jack according to an alternative embodiment of the disclosed subject matter.

Referring to FIG. 10, the wheel support assembly 486 is shown connected to the support frame assembly 304 by the lifting frame assembly 482. In various embodiments of the disclosed subject matter, the wheel support assembly 486 includes a pair of wheel supports 488 for engaging the wheels of a vehicle, with a central support 484 extending between them. In various embodiments, the wheel supports 488 include spaced apart wheel front support and wheel rear support 489.

In the embodiment shown in FIG. 10, the lifting frame assembly 482 includes a central support 484 for slidably attaching each wheel support 488 (e.g., in a telescoping arrangement). In particular embodiments, each wheel support mounting bar 490 includes an adjustment mechanism (e.g., a pin/hole arrangement such as the arrangement shown in FIG. 10) that is configured for: (1) allowing a user to selectively adjust the lateral position of the wheel support mounting bar 490 (and, therefore, the corresponding wheel support 488 relative to the central support 484); and (2) selectively maintaining the wheel support mounting bar 490 in any of a plurality of desired lateral positions. As commonly known and understood by those skilled in the art, the at least one wheel support assembly 486, the wheel support mounting bar 490, and the central support 484 together, comprise a vehicle engaging portion of the vehicle jack 302.

In the embodiment shown in FIG. 10, the lifting frame assembly 482 generally includes a guide assembly 492 for guiding the lifting frame assembly 482 along the support frame assembly 304. In various alternative embodiments, the support frame assembly 304 includes a lifting frame support assembly 316 mounted adjacent a base assembly 306, wherein the lifting frame assembly 482 is mounted adjacent the lifting frame support assembly 316.

The base assembly 306 shown in FIG. 10 includes a generally I-shaped member. The lifting frame support assembly 316 includes an elongated upright support that extends upwardly away from the base assembly 306 in a substantially vertical (e.g., vertical) orientation. In certain embodiments, at least two wheel brackets 308 are mounted to the vehicle jack 302 substantially adjacent to the point at which the base assembly 306 attaches to the lifting frame support assembly 316. The wheel bracket 308 is adapted to support one or more wheels 310 that are used to facilitate the movement of the vehicle jack 302 along a support surface. In particular embodiments, the vehicle jack 302 also includes a jack handle assembly 326 to facilitate movement of the vehicle jack 302. In the embodiment shown in FIG. 10, the jack handle assembly 326 is mounted adjacent an upper (e.g., a second end 324) of the lifting frame support assembly 316.

Figure 13:
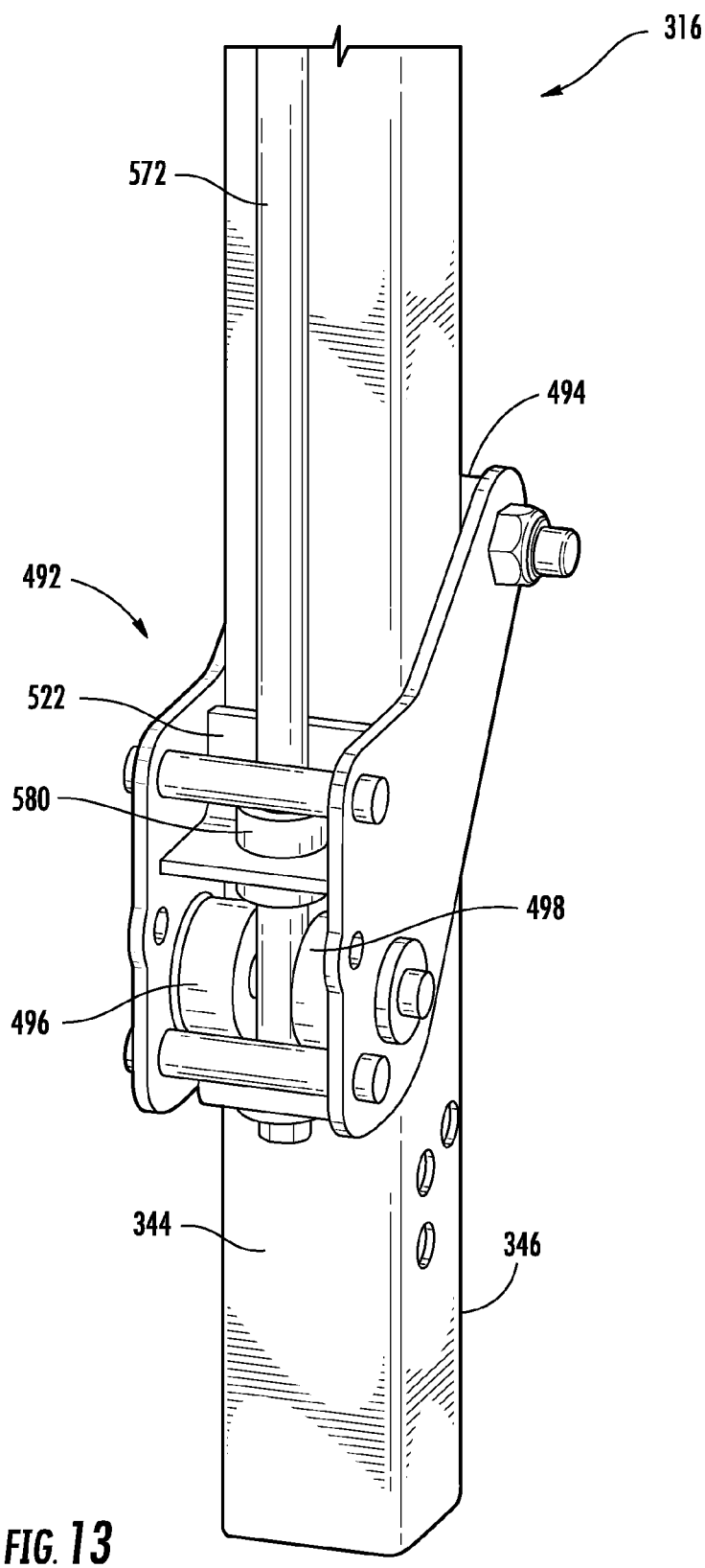
FIG. 13 is a perspective view of the guide assembly and the lifting frame support assembly of the vehicle jack of FIG. 10.
Figure 14:
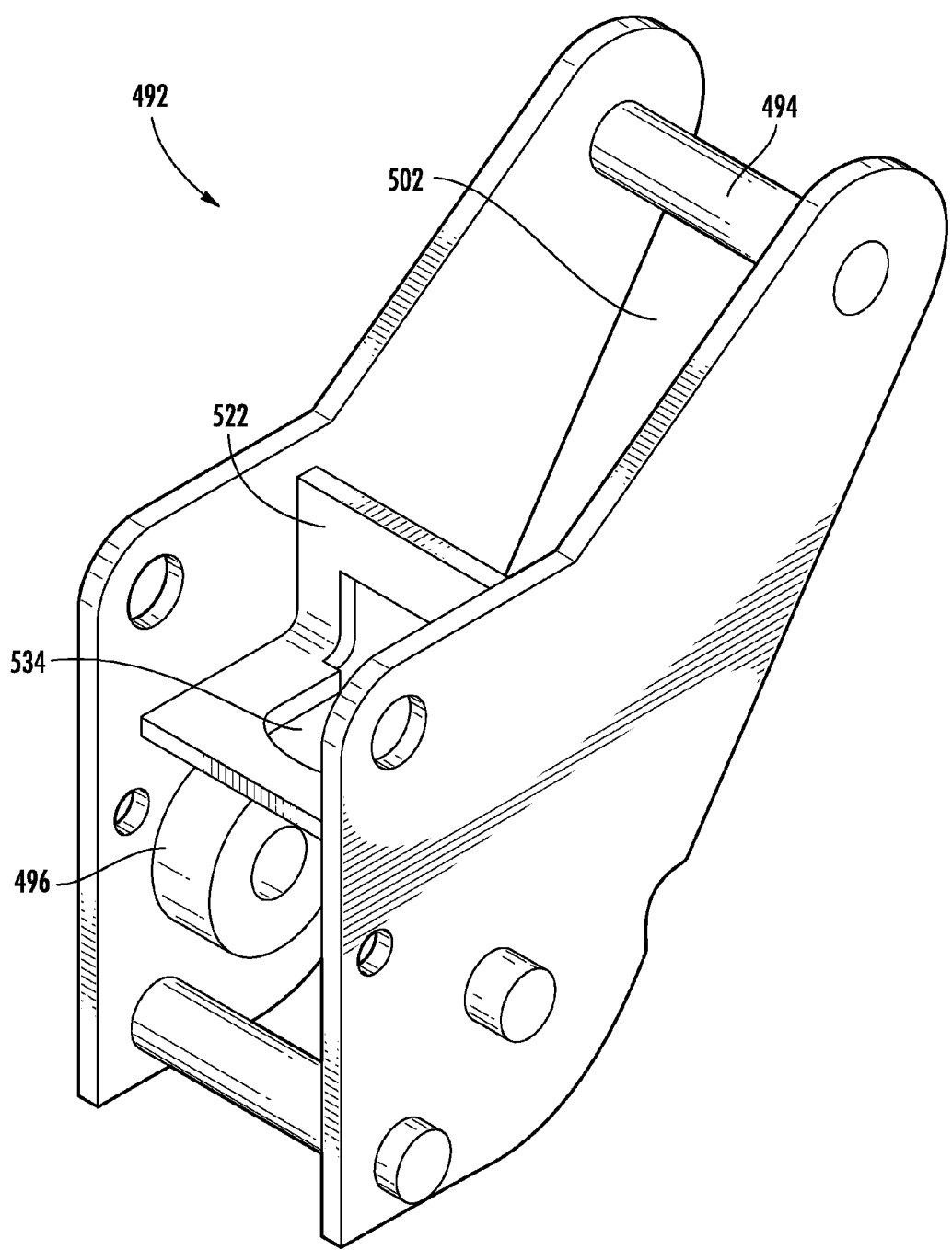
FIG. 14 is a perspective view of the guide assembly of the vehicle jack of FIG. 10.

As may be understood from FIGS. 13 and 14, the guide assembly 492, according to various embodiments of the disclosed subject matter, includes a first roller 494, a second roller 496, and a guide bracket 522. In the embodiment shown in FIG. 13, the guide assembly 492 also includes a third roller 498. In various embodiments of the disclosed subject matter, the first roller 494 is disposed adjacent a rear surface 346 of the lifting frame support assembly 316 (see FIG. 14). The second roller 496 and the guide bracket 522 are disposed adjacent a front surface 344 of the lifting frame support assembly 316 (see FIGS. 10 and 13). As shown in the embodiment of FIG. 13, the third roller 498 is disposed adjacent the front surface 344 and spaced apart from the second roller 496. A first channel 502 (shown in FIG. 14) is defined between the first roller 494 and the second roller 496 (and also, in certain embodiments, the third roller 498), and the elongated upright support of the lifting frame support assembly 316 extends through and moves along the first channel 502. In particular embodiments, at least a portion of the guide bracket 522 also defines the channel 502 (see FIG. 14). In various embodiments, as the guide assembly 492 travels along the elongated upright support, the first roller 494 and the second roller 496 engage opposing and spaced apart front surface 344 and rear surface 346 of the elongated upright support (see FIG. 13). In particular embodiments, the third roller 498 engages the front surface 344 as the guide assembly 492 travels along the elongated upright support. In particular embodiments, at least a portion of the guide bracket 522 also engages the front surface 344 as the guide assembly 492 travels along the elongated upright support.

Figure 17A:
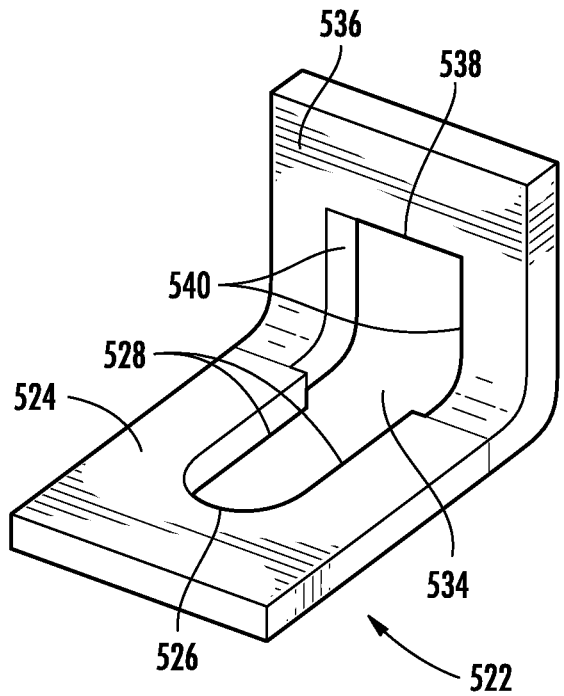
FIG. 17A is a perspective view of a guide bracket of the guide assembly of FIGS. 13 and 14.

As may be understood from FIGS. 14 and 17A, in particular embodiments, the guide bracket 522 may be substantially L-shaped and includes a substantially horizontal portion 524. In certain embodiments, the guide bracket 522 defines an interior opening 534 (e.g., a second channel). In the embodiment shown in FIG. 17A, the substantially horizontal portion 524 defines a substantially U-shaped channel 526, and the substantially vertical portion 536 defines a substantially rectangular-shaped channel 538 together form the interior opening 534. In particular embodiments, as shown in FIGS. 17B and 17C, a width 544 of the rectangular-shaped channel 538 is greater than a width 532 of the U-shaped channel 526 along an axis extending through the vertical portion 536 and the horizontal portion 524.

Figure 17B:
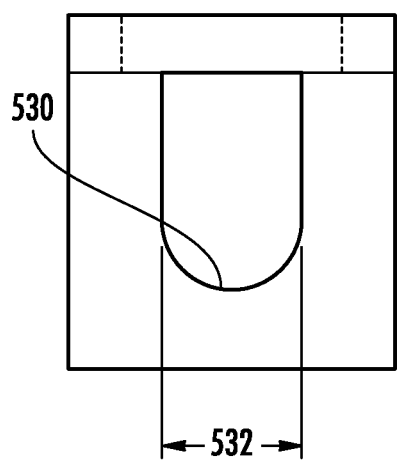
FIG. 17B is a top view of the guide bracket of FIG. 17A.
Figure 17C:
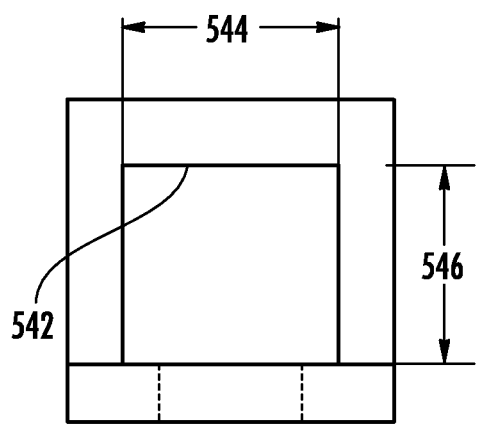
FIG. 17C is a front view of the guide bracket of FIG. 17A.

As may be understood from FIGS. 17A-C, in various embodiments, the U-shaped channel 526 in the guide bracket 522 includes two opposing and spaced apart interior side surfaces 528 and an interior front surface 530. In particular embodiments, the interior front surface 530 forms an arc between the interior side surfaces 528. In the depicted embodiment, the rectangular-shaped channel 538 defined by the guide bracket 522 includes two opposing and spaced apart interior side surfaces 540 and an interior end surface 542. In particular embodiments, the interior end surface 542 is substantially planar.

Figure 15:
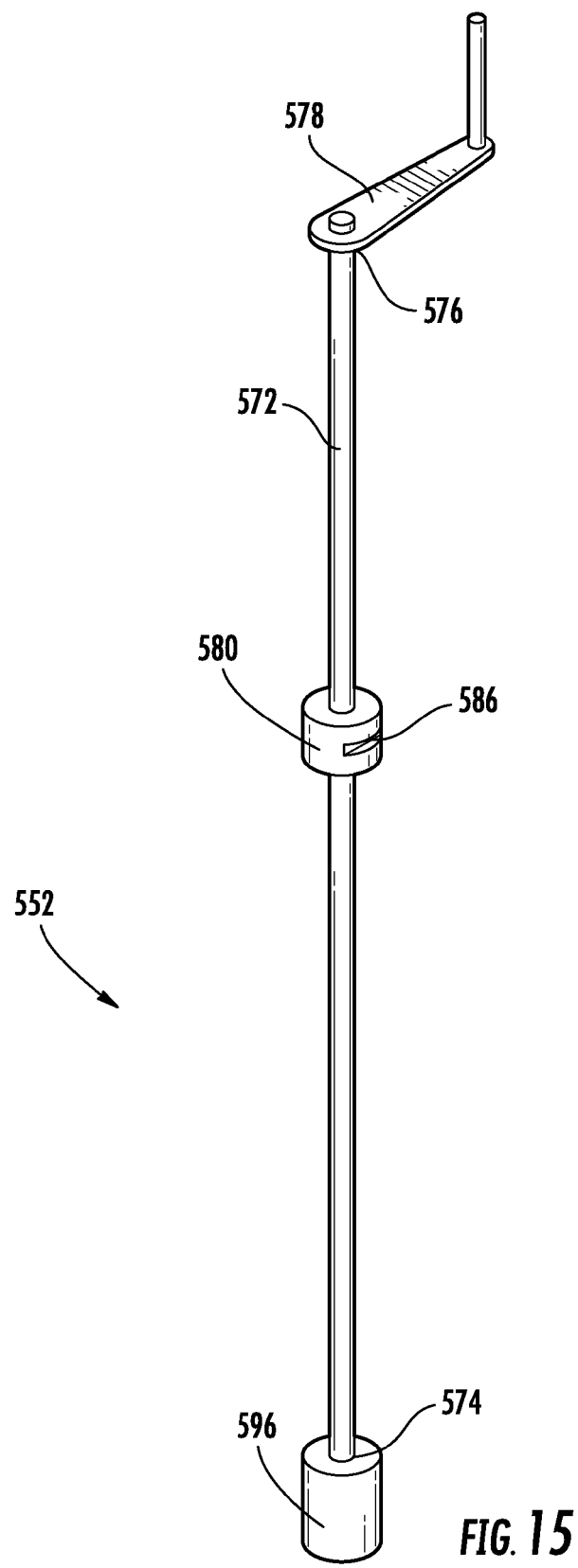
FIG. 15 is a perspective view of the elevation assembly of the vehicle jack of FIG. 10.
Figure 16A:
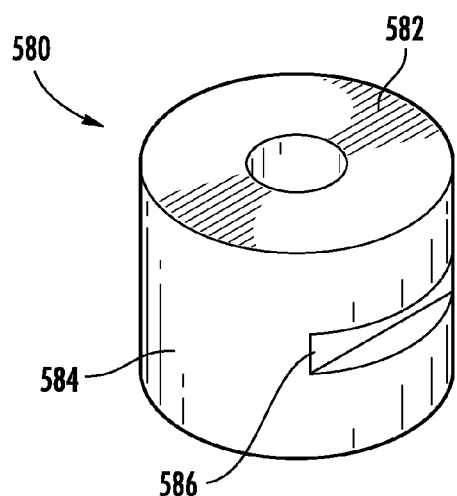
FIG. 16A is a perspective view of a threaded member of the elevation assembly of FIG. 15.
Figure 16B:
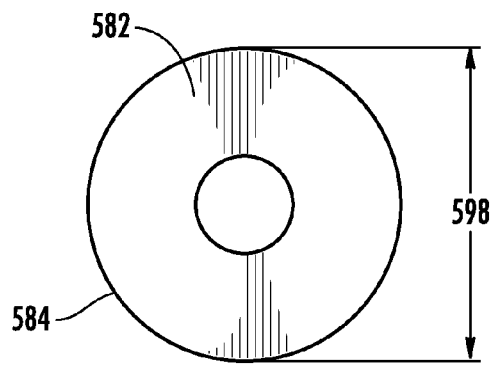
FIG. 16B is a top view of the threaded member of FIG. 16A.
Figure 16C:
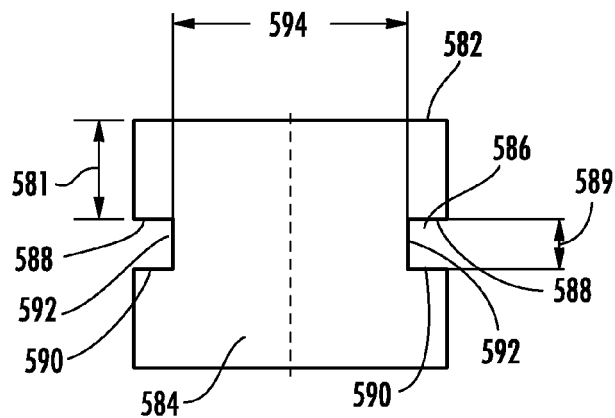
FIG. 16C is a front view of the threaded member of FIG. 16A.
Figure 16D:
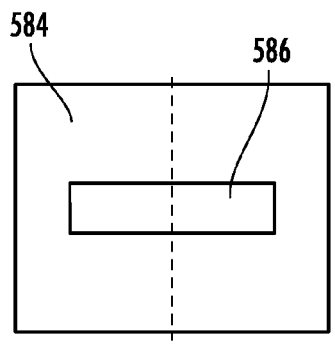
FIG. 16D is a side view of the threaded member of FIG. 16A.

Turning to FIG. 15, an elevation assembly 552, according to an embodiment, moves the guide assembly 492 (and, therefore, the lifting frame assembly 482) (see FIG. 10) upwardly relative to the lifting frame support assembly 316. The depicted elevation assembly 552 includes an elongated support member 572 (e.g., a rod, bar, post, and/or any other suitable support member) and a threaded member 580 (e.g., a nut, washer, ring, and/or any other suitable threaded member). In certain embodiments, an exterior surface of the elongated support ember 572 defines threads. Similarly, in certain embodiments, interior surfaces of the threaded member 240 and the base member 250 define threads that correspond with the threads of the elongated support member 572 such that the threaded member 580 and the base member 596 matingly engage the elongated support member 572. In this manner, rotation of the elongated support member 572 relative to the threaded member 580 results in travel of the threaded member 580 along a length of the elongated support member 572. The depicted elevation assembly 552 also includes a handle 578 that is mounted adjacent (e.g., to) the upper end 324 of the elongated upright support (see FIG. 10). In various embodiments, the handle 578 is mounted adjacent (e.g., to) an upper end of the elongated support member 572, thereby, permitting rotation of the elevation assembly 552 (and, therefore, as described below, travel of the lifting frame assembly 482 relative to the elongated upright support). In alternative embodiments, the elongated support member 572 is rotated automatically (e.g., via an electric motor).

As may be understood from FIGS. 16A-D, the threaded member 580, according to various embodiments, includes a top surface 582 of the threaded member 580. In particular embodiments, the at least two grooves 586 include interior top surfaces 588, interior bottom surfaces 590, and interior back surfaces 592, wherein the interior top surface 582 and interior bottom surface 590 are separated by a distance 589. In particular embodiments, the at least two grooves 586 are located on opposing and spaced apart sides of the threaded member 580. As may also be understood from FIGS. 16A-D, the interior back surfaces 592 are separated by a distance 594. In particular embodiments, the distance 594 is less than a diameter 598 of the threaded member 580. As may also be understood from FIGS. 11 and 13, the threaded member 580 is fixed relative to the guide assembly 492. In particular embodiments, engagement of the at least two grooves 586 with opposing and spaced apart surfaces on the guide assembly 492 (as disclosed in more detail later) fixes the threaded member 580 relative to the guide assembly 492.

Figure 11:
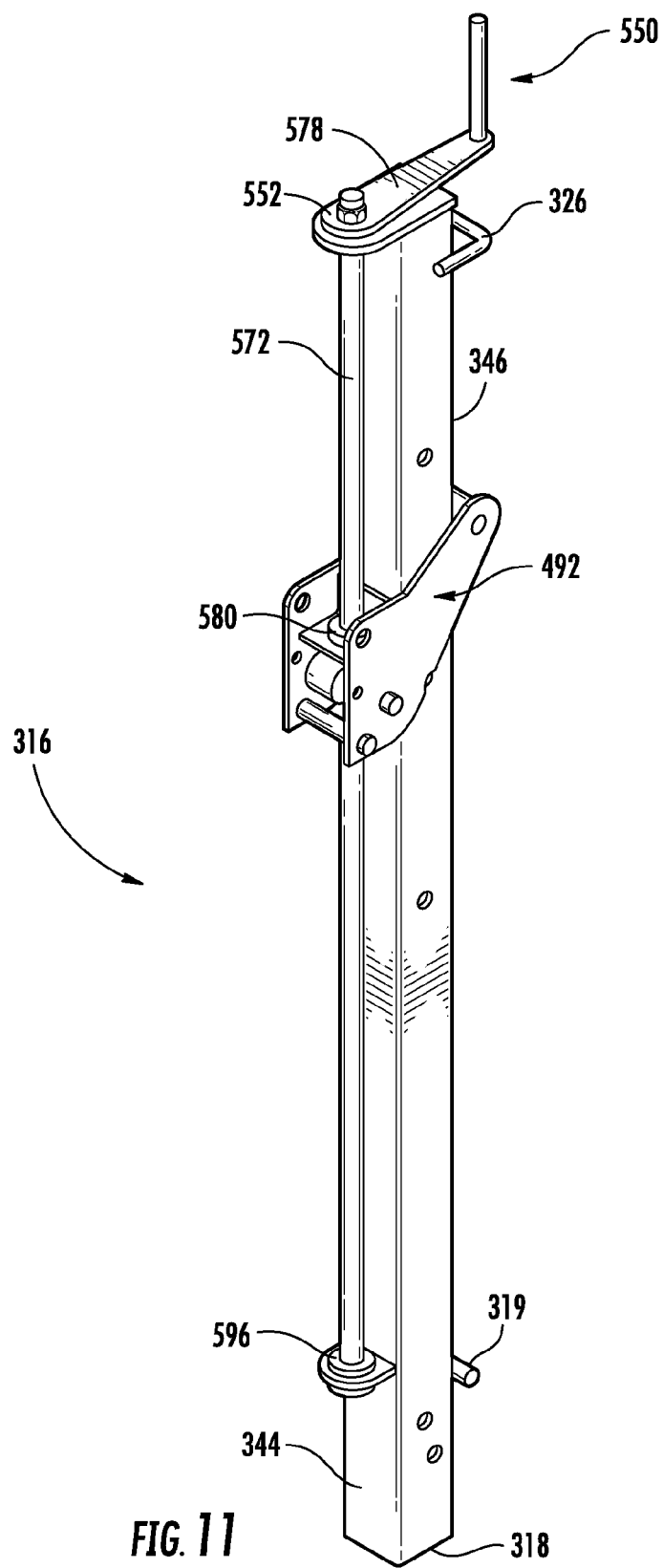
FIG. 11 is a perspective view of a lifting frame support assembly of the vehicle jack of FIG. 10.

In various embodiments according to FIGS. 10 and 11, the guide assembly 492 of the lifting frame assembly 482 is mounted adjacent (e.g., to) the elongated upright support to permit movement of the guide assembly 492 (and, therefore, the lifting frame assembly 482) along the length of the elongated upright support. In the embodiment shown in FIG. 11, travel of the guide assembly 492 along the length of the elongated upright support is limited in the downward direction by a horizontal bar 319 disposed adjacent a lower (e.g. a first) end 318 of the elongated upright support. Similarly, travel of the guide assembly 492 along the length of the elongated upright support is limited in the upward direction by the jack handle assembly 326 attached adjacent (e.g. to) the upper end 324 (see FIG. 12) of the elongated upright support.

According to various embodiments, the elevation assembly 552 is mounted adjacent (e.g. to) the elongated upright support. In particular embodiments (see FIG. 12), the elongated upright support includes a first bracket 340 attached adjacent (e.g., to) the upper end 324 of the elongated upright support and a second bracket 320 attached adjacent (e.g., to) the lower end 318 of the elongated upright support. As may be understood from FIG. 12, the first 340 and second 320 brackets each include an opening 342. In particular embodiments, the opening 342 is at least larger than a diameter of the elongated support member 572. In the embodiment shown in FIG. 12, the opening 342 is substantially circular and has a diameter at least greater than a diameter of the elongated support member 572.

Figure 12:
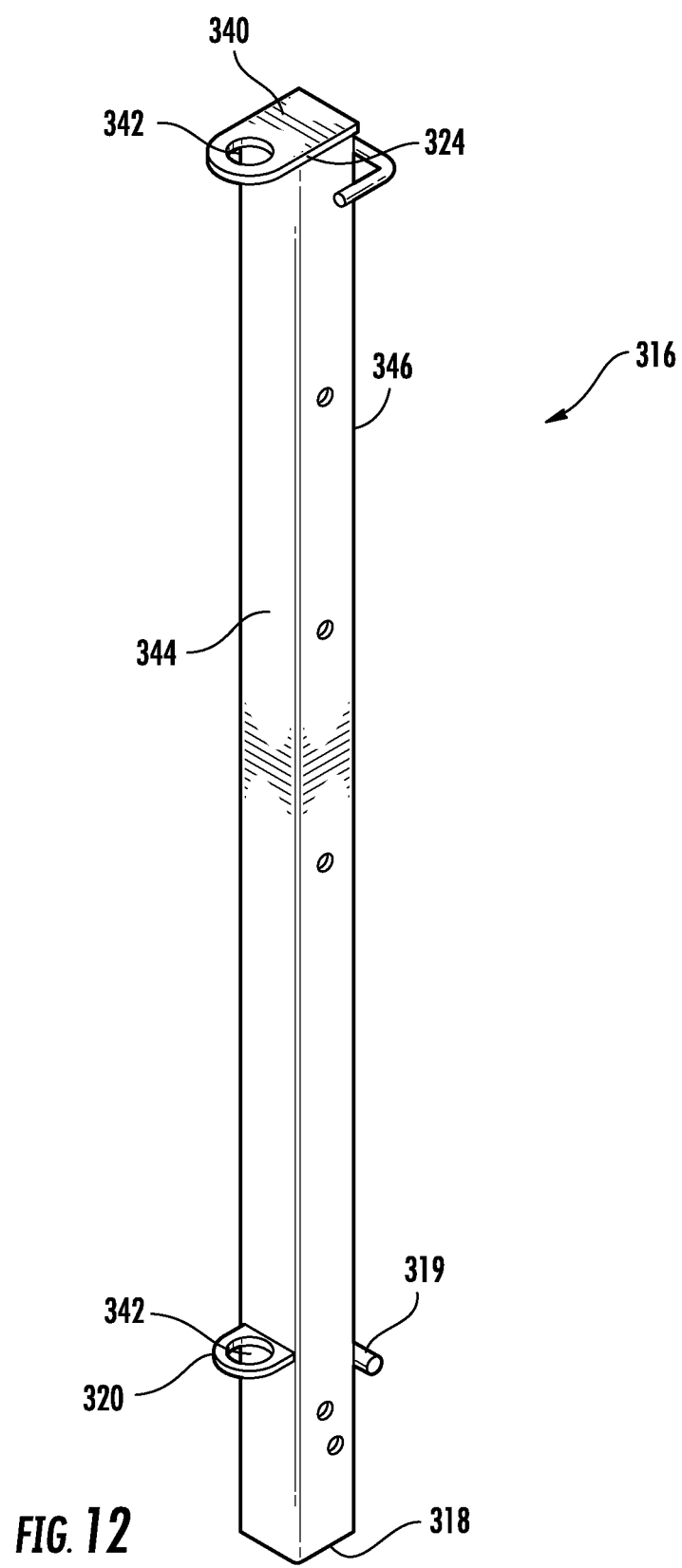
FIG. 12 is a perspective view of the lifting frame support assembly and a lifting frame assembly of the vehicle jack of FIG. 10.

As may be understood from FIGS. 11, 12, and 15, in particular embodiments, an upper (e.g., a second) end 576 of the elongated support member 572 is adapted to pass through the first bracket's opening 342. In particular embodiments, as shown generally in FIG. 11, the upper end 576 may be adapted to be mounted adjacent (e.g., to) the handle 578 adjacent a top surface of the first bracket 340 using one or more fasteners (e.g., nuts, adhesive, clip, and/or other suitable fasteners). In particular embodiments, a lower (e.g., a first) end 574 of the elongated support member 572 passes through the second bracket's opening 342. In the embodiment shown in FIG. 11, the lower end 574 may be likewise adapted to be mounted adjacent (e.g. to) a bottom surface of the second bracket 320 using one or more fasteners (e.g., nuts, adhesive, clip, and/or other suitable fasteners). In this manner, according to various embodiments, the threaded elongated support member 572 (and, therefore, the elevation assembly 552) is attached adjacent (e.g., to) the elongated upright support. Further, in particular embodiments (see FIG. 11) a length of the threaded elongated support member 572 between the lower 574 and upper 576 ends of the threaded elongated support member 572 is spaced sufficiently apart from a front side 344 of the elongated upright support to permit unobstructed movement of the guide assembly 492 along the length of the elongated upright support.

As may be understood from FIG. 11, the guide assembly 492, according to various embodiments of the invention, is attached adjacent (e.g., to) the elevation assembly 554. In particular embodiments of the invention, as illustrated in FIGS. 13 and 14, the guide bracket 522 of the guide assembly 492 operatively engages the threaded member 580 of the elevation assembly 552.

As may be understood from FIGS. 16A-D and 17A-C, in certain embodiments, the distance 594 between opposing interior back surfaces 592 of grooves 586 generally corresponds to the width 532 of the U-shaped channel 526, thereby permitting the threaded member 580 to matingly engage the U-shaped channel 526. In particular, the opposing and spaced apart interior side surfaces 528 of the U-shaped channel 526 matingly engage the opposing interior back surfaces 592 of the threaded member 580. Further, the interior top surfaces 588 and interior bottom surfaces 590 of the grooves 586 matingly engage the corresponding top and bottom surfaces of the horizontal portion 524 of the guide bracket 522. In addition, the arc defined by the interior front surface 530 of the U-shaped channel 526 corresponds with and matingly engages an arc defined by the exterior surface 584 disposed between the opposing grooves 586 of the threaded member 580.

As may be understood from FIGS. 16A-D and 17A-C, in particular embodiments, engagement of the interior back surface 592 of the threaded member 580 grooves 586 with the opposing and spaced apart side surfaces 528 prevents rotation of the threaded member 580 relative to the guide bracket 522 even when the elongated support member 572 is rotated relative to the threaded member 580. In this manner, rotation of the threaded member 580 relative to the elongated support member 572 causes the threaded member 580 to move the guide bracket 522 (and, therefore, the guide assembly 492 and the lifting frame assembly 482) (see FIG. 11) along a length of the elongated upright support.

As may be understood from FIGS. 11 and 15, turning the handle 570 of the elevation assembly 552 (and, therefore, the elongated support member 572) in a take-up direction rotates the elongated support member 572, which in turn causes the threaded member 580 to travel upwardly along a length of the elongated support member 572. This causes the interior bottom surface 590 of the threaded member 580 to engage and move the guide bracket 522 (and, therefore, the guide assembly 492 and the lifting frame assembly 482) upwardly along the length of the elongated upright support. Similarly, turning the handle 578 in a take-down direction (which may be, for example, opposite to the take-up direction), causes the interior top surface 588 of the threaded member 580 to engage and move the guide bracket 522 (and, therefore, the guide assembly 492 and the lifting frame assembly 482) downwardly along the length of the elongated upright support.

As may also be understood from FIGS. 16A-D and 17A-C, in various embodiments, a length 546 of the rectangular-shaped channel 538 corresponds, at least approximately, to a distance 581 between the top exterior surface 582 of the threaded member 580 and the interior top surface 588 of the grooves 586. In particular embodiment, the top surface 582 of the threaded member 580 matingly engages the interior end surface 542 of the rectangular-shaped channel 538. In this embodiment, rotation of the threaded member 580 relative to the elongated support member 572 causes the top exterior surface 582 of the threaded member 580 to move the guide bracket 492 (and, therefore, the lifting frame assembly 482) along the length of the elongated upright support.

Operation of Various Embodiments of the Invention
Ratchet Driven Embodiment

In particular embodiments, to use the vehicle jack 102, a user first adjusts the vehicle jack 102 so that the wheel support assembly 186 is in at least substantial alignment with the two front wheels of a vehicle (e.g., a riding lawn mower). The user then lowers the wheel support assembly 186 to a loading position in which the wheel supports 188 are disposed adjacent (e.g., on) a support surface (e.g., a support surface that is supporting the vehicle jack 102). The user then moves the vehicle (e.g., a riding lawn mower) into a pre-lifting position in which each of the vehicle's front wheels are disposed on a respective one of the wheel supports 188. In a particular embodiment, when the vehicle engages the wheel support assembly 186 in the loading position, each of the vehicle's front wheels are positioned so that the bottom portion of the wheel is disposed between the wheel front support and wheel rear support that are spaced apart within the wheel supports 188.

Next, the user engages the lifting frame actuation mechanism 252 to raise and lower the wheel support assembly 186. In the particular embodiment shown in FIG. 1, the user actuates the brake winch 258 by turning the handle to rotate the brake winch 258, and rotate the winch belt 260 around the take-up spool. This, in turn, causes the winch belt 260 to lift the lifting frame assembly 182, and in turn the wheel support assembly 186 into an elevated position in which the wheel supports 188 are elevated (e.g., by at least 6 inches) above the support surface supporting the vehicle jack 102.

In particular embodiments, as the wheel support assembly 186 is being moved from the loading position to the elevated position, the ratchet assembly 192 moves upward along a portion of the length of the elongated upright support. As this occurs, the first roller 194 of the ratchet assembly rolls along the front surface 144 of the upright support, and the second roller 196 rolls along the rear surface 146 of the upright support. During the elevation process, the toothed bar engagement pin 210 engages the outer surface of a ratchet tooth 166 on each of the two toothed bars 154 (e.g., the lowest ratchet tooth 166 on each of the toothed bars 154) and, as the ratchet assembly 192 moves upwardly adjacent the ratchet tooth 166, the toothed bar engagement pin 210 moves (e.g., rolls) along the outer perimeters of the ratchet tooth 166. During this process, the toothed bar engagement pin 210 is urged toward (and thereby maintained in contact with) the ratchet tooth 166 by the spring 214. After the toothed bar engagement pin 210 passes the peak portion of a ratchet tooth 166, the toothed bar engagement pin 210 moves into two offset, downwardly sloping troughs defined between the each ratchet tooth 166 (e.g., the second lowest tooth on the toothed bar 154). When in this position, the spring 214 maintains the toothed bar engagement pin 210 in place within the troughs, and the ratchet teeth 166 cooperate to prevent the toothed bar engagement pin 210 from moving downwardly past the lower ratchet teeth 166. In various embodiments, this serves as a safety mechanism that would prevent the lifting frame assembly 182 from falling in the event that the brake associated with the winch assembly 254 fails.

As the ratchet assembly 222 continues to move upwardly relative to the elongated upright support, the toothed bar engagement pin 210 continues to move relative to various other pairs of ratchet teeth as described above. During the upward movement of the ratchet assembly 222 relative to the toothed rack assembly 152, the toothed bar engagement pin 210 intermittently snaps into place in the various downwardly sloping troughs between the ratchet teeth 166.

When the vehicle front wheels are elevated sufficiently off the ground to allow the user to perform the desired maintenance on the vehicle, the user stops actuation of the winch assembly 254 in the winch belt 260 take-up direction. As a result, the toothed bar engagement pin 210 settles into a particular pair of troughs defined between two particular pairs of ratchet teeth. As noted above, this provides an additional safety feature that would prevent the lifting frame assembly 182 from falling in the event that the brake on the winch assembly 254 fails.

When the user is ready to lower the vehicle (e.g., when the desired vehicle maintenance is complete) the user squeezes the release handle assembly 162 toward the jack handle assembly 126 which, in turn, moves the release handle assembly 162 upwardly toward the jack handle assembly 126. Due to the mechanical linking between the release handle assembly 162 and the toothed rack assembly 152 (see FIG. 5), the upward movement of the release handle assembly 162 causes the ratchet teeth 166 to, in turn, move upwardly. Due to the shape and angled orientation of the respective pin slots 168 on the toothed bar 154 and the position of the mounting pins 170 within the slots (see FIG. 2), as the toothed bars 154 move upwardly, they also move inwardly (or toward the front surface 144 of the elongated upright support), away from the toothed bar engagement pin 210, until none of the ratchet teeth 166 are positioned vertically below the toothed bar engagement pin 210. Next, while continuing to squeeze the release handle assembly 162 toward the jack handle assembly 126, the user cranks the winch handle in the belt release direction. This causes the winch belt 260 to unwind off the brake winch's take-up spool that, in turn, lowers the lifting frame assembly 182. The user continues this process until the vehicle jack 102 lifting frame assembly 182 returns to a position in which the wheel jack's wheel support assemblies 186 are disposed adjacent (e.g., on) the support surface (e.g., a support surface that is supporting the vehicle jack 101). In the embodiment shown in FIG. 1, vertical travel of the ratchet assembly 192 is limited in the downward direction by a horizontal bar 119 disposed adjacent the lower end 118 of the elongated upright support (see FIG. 2). The user may then roll the vehicle away from the vehicle jack 102.

Screw Driven Embodiment

In the alternative embodiment shown in FIGS. 10-17, the user engages the lifting frame actuation mechanism 550 of the vehicle jack 302 to raise and lower the wheel support assembly 486. In particular, the user turns the handle 578 of the elevation assembly 552 in a take-up direction, which causes the elongated support member 572 to rotate relative to the threaded member 580. Because the interior back surfaces 592 adjacent the grooves 241 of the threaded member 580 fix the threaded member 580 relative to the guide assembly 492, rotation of the elongated support member 572 in a take-up direction relative to the threaded member 580 causes the threaded member 580 to move upwardly along the length of the elongated support member 572. This upward travel of the threaded member 580, in turn, causes the interior bottom surfaces 590 adjacent the grooves 586 of the threaded member 580 to engage the guide bracket 522 of the guide assembly 492, thereby causing the guide assembly 492 (and, therefore, the lifting frame assembly 482) to likewise move upwardly along the length of the elongated support member 572. In this manner, in particular embodiments of the disclosed subject matter, turning the handle 578 in a take-up direction lifts the lifting frame assembly 482 to an elevated position in which the wheel support assemblies 486 are elevated (e.g., by at least 6 inches) above the support surface that is supporting the vehicle jack 302.

As the lifting frame assembly 482 is being moved from the loading position to the elevated position, the guide assembly 492 moves upwardly along a portion of the length of the elongated upright support. As this occurs, the first roller 494 of the guide assembly 492 rolls along the rear surface 346 of the elongated upright support and the second roller 496 and third roller 498 slide along the front surface 344 of the elongated upright support. During this process, the opposing grooves 586 on the threaded member 580 engage opposing and spaced apart interior side surfaces 528 of the guide bracket's U-shaped channel 526. Additionally, during this process, the interior bottom surfaces 590 engage the horizontal portion 524 of the guide bracket 522, and the top surface 582 of the threaded member 580 engages an interior end surface 542 of the guide bracket's rectangular-shaped channel 538. In this manner, in particular embodiments, the engagement of multiple surfaces of the threaded member 580 against multiple surfaces of the guide bracket 522 moves the lifting frame assembly 482 along a portion of the length of the elongated upright support.

When the front wheels of the vehicle have been elevated sufficiently off of the ground to allow the user to perform the desired maintenance on the vehicle, the user stops turning the handle 578 (and, therefore, the elevation assembly 552) in the take-up direction. As a result, the threaded member 580 settles into a self-locking position relative to the threads on the elongated support member 572. In addition, according to various embodiments, releasing the handle 578 ceases the rotational force upon the elongated support member 572, thereby selectively locking the interior back surfaces 592 of the threaded member's grooves 586 against the opposing and spaced apart interior side surfaces 528 of the U-shaped channel 526 of the guide bracket 522. When selectively locked, as such, the interior back surfaces 592 prevent inadvertent movement of the elongated support member 572 (and, therefore, the lifting frame assembly 482) until such time as the rotational force is reapplied by a user again turning the handle 578 (in either a take-up or take-down direction).

When the user is ready to lower the vehicle (e.g., when the desired vehicle maintenance is complete) the user turns the handle 578 of the elevation assembly 552 in a take-down direction (for example, in a direction opposite the take-up direction), which provides the necessary rotational force to cause the elongated support member 572 to rotate relative to the threaded member 580. This, in turn, causes the threaded member 580 to engage the guide bracket 522 of the guide assembly 492, which in turn lowers the lifting frame assembly 482 relative to the elevated position in which the wheel support assemblies 486 were previously disposed.

Specifically, according to various embodiments, turning the handle 578 in the take-down direction causes the interior top surface 588 adjacent the grooves 586 of the threaded member 580 to engage the horizontal portion 524 of the guide bracket 522, which in turn lowers the lifting frame assembly 482. The user continues this process until the lifting frame assembly 482 returns to the loading position in which the wheel support assembly 486 is disposed adjacent (e.g., on) the support surface (e.g., a support surface that is supporting the vehicle jack 302). The user may then roll the vehicle away from the vehicle jack 302.

Alternative Ratchet Driven Embodiment

Figure 18:
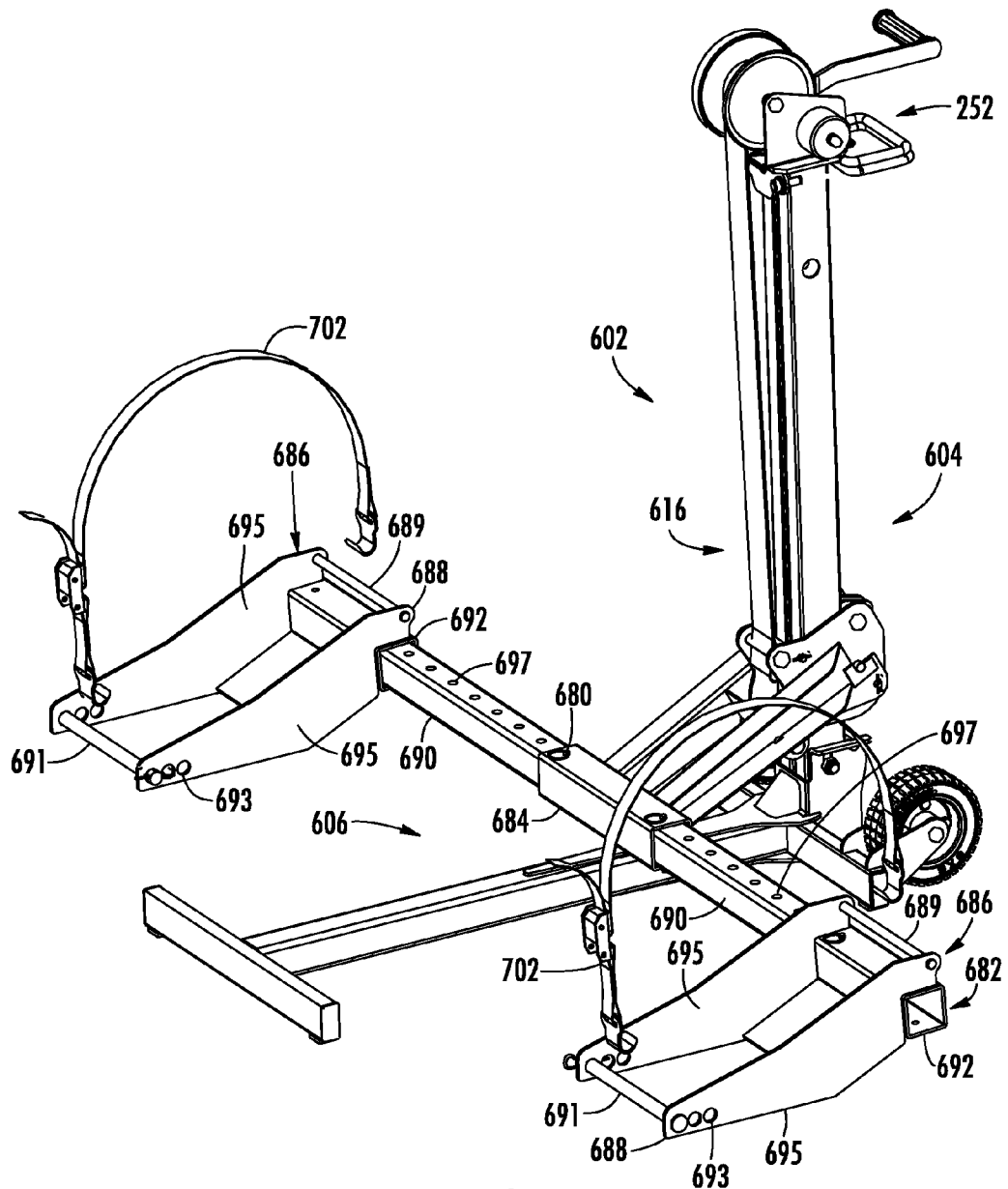
FIG. 18 is a front perspective view of an alternative embodiment vehicle jack embodying principles of the disclosed subject matter.
Figure 19:
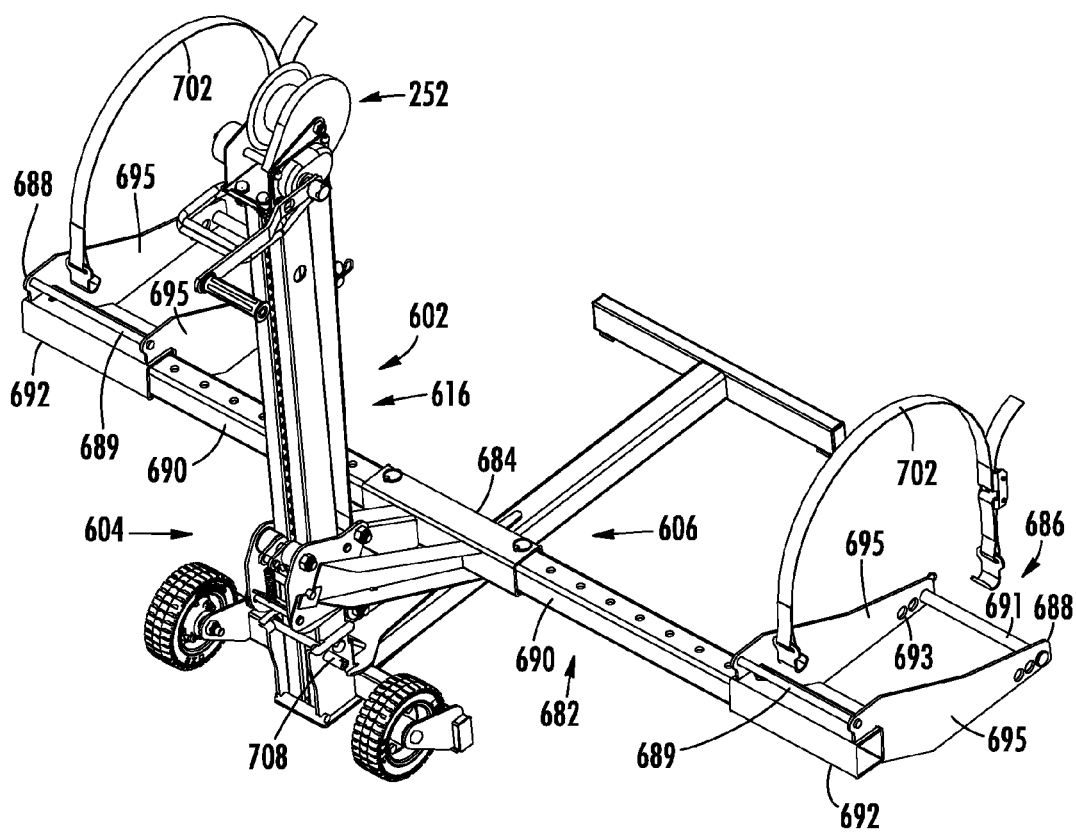
FIG. 19 is a rear perspective view of vehicle jack of FIG. 18.

FIGS. 18-19 show an alternative embodiment vehicle jack 602 embodying principles of the disclosed subject matter. In an embodiment, the vehicle jack 602 generally comprises a wheel support assembly 686 connected to a support frame assembly 604. In alternative embodiments, the wheel support assembly 686 is connected to the support frame assembly 604 by a lifting frame assembly 682. In various alternative embodiments, the support frame assembly 604 includes a lifting frame support assembly 616 mounted adjacent a base assembly 606, wherein the wheel support assembly 686 is mounted adjacent the lifting frame support assembly 616. The wheel support assembly 686 is selectively raised and selectively lowered by the lifting frame actuation mechanism 252, as generally described above.

Referring to FIGS. 18-19, the wheel support assembly 686 is shown connected to the support frame assembly 604 by the lifting frame assembly 682. In various embodiments of the disclosed subject matter, the wheel support assembly 686 includes a pair of wheel supports 688 for engaging the wheels of a vehicle. In various embodiments, the wheel supports 688 include a spaced apart wheel front support 691 and a wheel rear support 689. In the embodiment shown in FIG. 18, the spaced apart wheel supports are bars. The wheel support assembly 686 is shown with a mounting support 692 at the rear for mounting the wheel support assembly 686 to a wheel support mounting bar 690. The wheel supports 688 are shown with wheel side supports 695. The front of the wheel side support 695 includes a plurality of apertures 693 for slidably receiving the wheel front support 691, and for adjusting the distance between the wheel front support 691 and wheel rear support 689 allowing the wheel support assembly 686 to accommodate vehicle wheels of varying sizes.

In the embodiment shown in FIGS. 18-19, the lifting frame assembly 682 includes a central support 684 for slidably mounting each wheel support 688. In various embodiments of the disclosed subject matter, the wheel supports 688 are mounted to the central support 684 by the wheel support mounting bar 690. Each wheel support mounting bar 690 includes a plurality of apertures for receiving a securing member, such as a fastener or pin. An end of the wheel support mounting bar 690 is received within the central support 684 and secured thereto by the securing member. The opposite end of the wheel support mounting bar 690 is slidably received within the mounting support 692 and secured thereto by a securing member. The sliding arrangement of the wheel support mounting bar 690 and mounting support 692 allows the spacing between the wheels supports 688 to be adjusted allowing the vehicle jack 602 to accommodate vehicles having wheels spaced apart by varying distances. A wheel strap 702 may be used to secure the vehicle wheels to the wheel supports 688. The wheel strap 702 is placed over the top of the vehicle wheel and includes securing members, such as hooks, to attach the wheel strap 702 to the wheel rear support 689 and wheel front support 691.

The vehicle jack 602 is provided with a release mechanism for separating the base assembly 606 from the lifting frame support assembly 616. In various embodiments, the release mechanism is a release pin 708 located at the base of the lifting frame support assembly 616 that is slidably received within aligned apertures in the base assembly 606 and lifting frame support assembly 616. In the embodiment shown in FIGS. 18-19, the release pin 708 includes a pin that is slidably received within a housing attached to the base assembly 606. The pin 708 passes through an aperture in the wall of the base assembly 606 into an aperture in the lifting frame support assembly 616 limiting separation of the two. A spring biases the pin 708 into engagement with the apertures. The base assembly 606 and lifting frame support assembly 616 are separated by pulling the pin 708 outward against the biasing force of the spring to withdraw the pin 708 from the aperture in the lifting frame support assembly 616.

Alternative Screw Driven Embodiment

FIGS. 20-24 show an alternative embodiment vehicle jack 802 embodying principles of the disclosed subject matter. In an embodiment, the vehicle jack 802 generally comprises a wheel support assembly 886 connected to a support frame assembly 804. In alternative embodiments, the wheel support assembly 886 is connected to the support frame assembly 804 by a lifting frame assembly 882. In various alternative embodiments, the support frame assembly 804 includes a lifting frame support assembly 816 mounted adjacent a base assembly 806, wherein the wheel support assembly 886 is mounted adjacent the lifting frame support assembly 816. The wheel support assembly 886 is selectively raised and selectively lowered by the lifting frame actuation mechanism 550.

Figure 20:
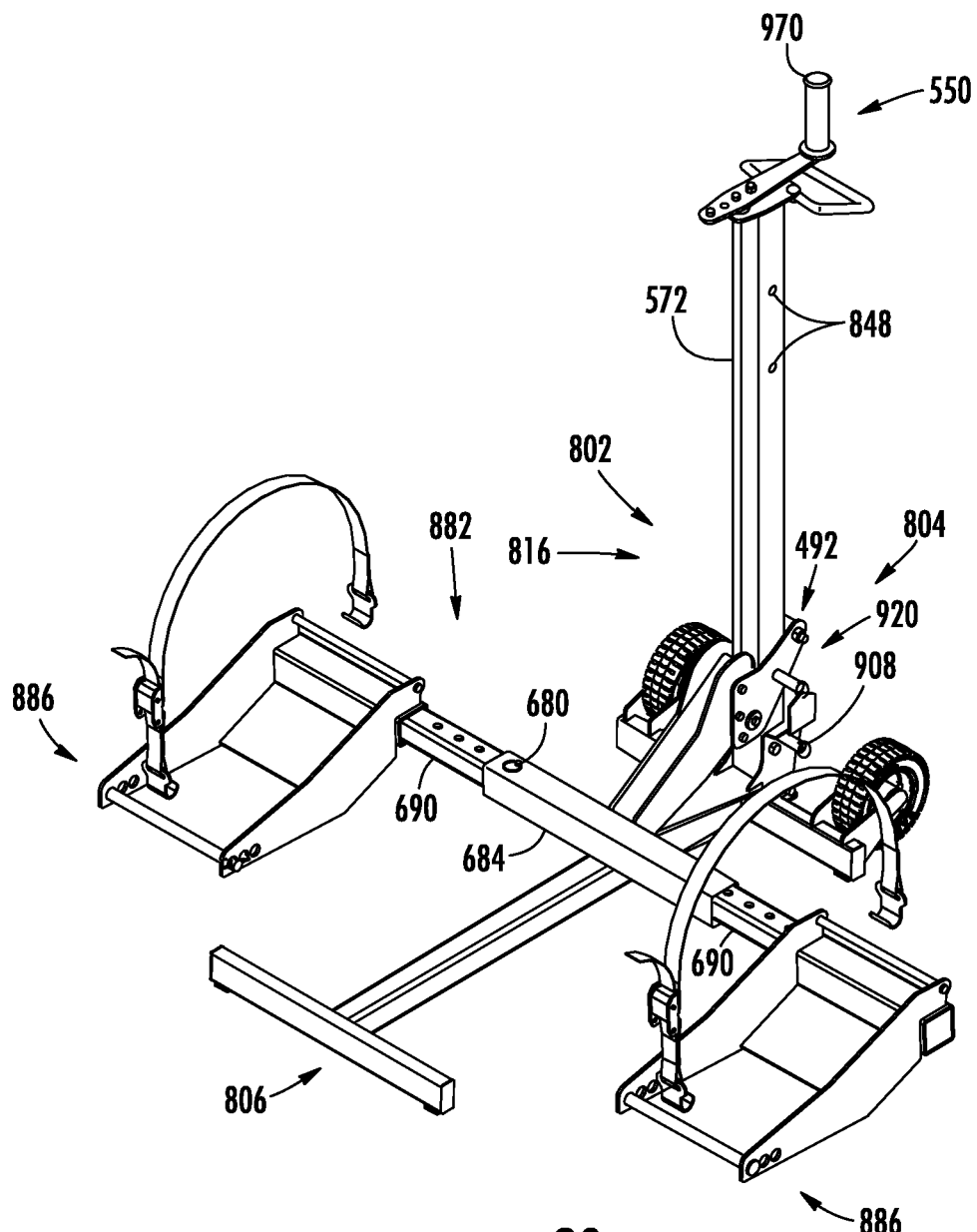
FIG. 20 is a front perspective view of an alternative embodiment vehicle jack embodying principles of the disclosed subject matter.
Figure 24:
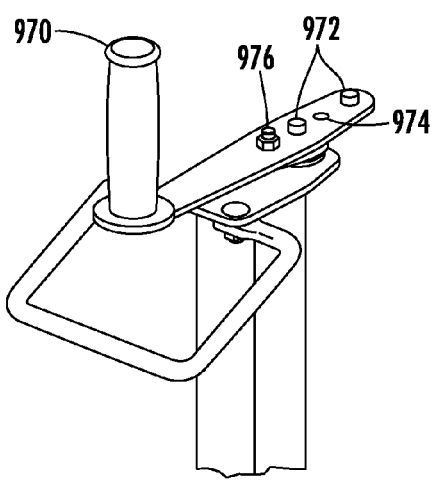
FIG. 24 is a perspective view of the handle.
Figure 21:
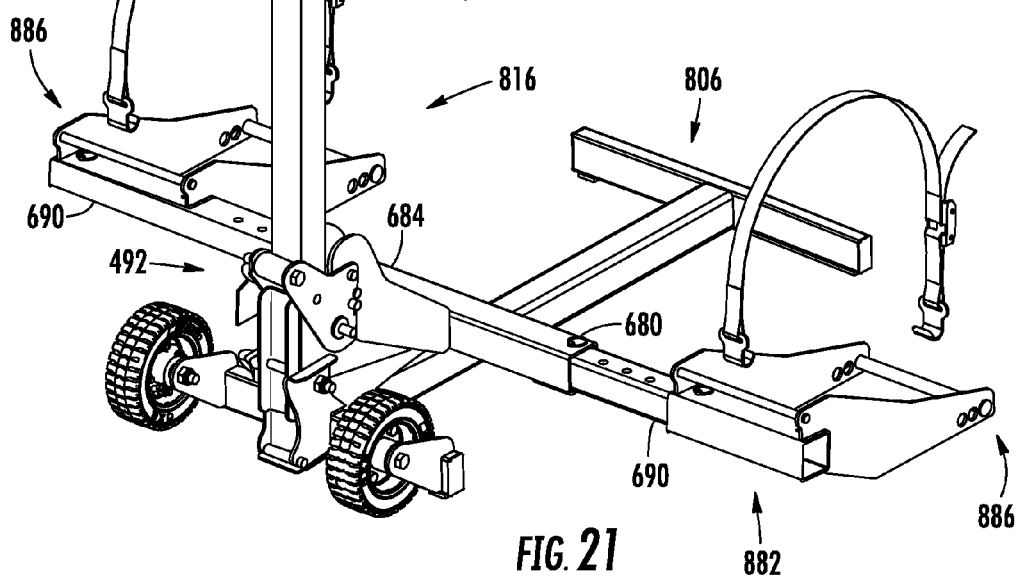
FIG. 21 is a rear perspective view of the vehicle jack of FIG. 20.

Referring to FIGS. 20-21, the wheel support assembly 886 is shown connected to the support frame assembly 804 by the lifting frame assembly 882. In the embodiment shown in FIGS. 20-21, the wheel support assemblies 886 are secured directly to the wheel support mounting bar 690, and the wheel support mounting bar 690 is slidably received within the central support 684 and secured by a fastener or pin 680. The distance between the wheel supports 688 may be adjusted by sliding them toward or away from each other.

The vehicle jack 802 is provided with a release mechanism for separating the base assembly 806 from the lifting frame support assembly 816. In various embodiments, the release mechanism is a release pin 908 located at the base of the lifting frame support assembly 816 that is slidably received within aligned apertures in the base assembly 806 and lifting frame support assembly 816. In the embodiment shown in FIG. 20, the release pin 908 includes a pin that is slidably received within a housing attached to the base assembly 806. The pin 908 passes through an aperture in the wall of the base assembly 806 into an aperture in the lifting frame support assembly 816 thereby limiting separation of the two. A spring biases the pin 908 into engagement with the apertures. The base assembly 806 and lifting frame support assembly 816 are separated by first pulling the pin 908 outward against the biasing force of the spring to withdraw the pin 908 from the aperture in the lifting frame support assembly 816. The lifting frame support assembly 816 is then separated from the base assembly 806 allowing the vehicle jack 802 to fold flat for easy storage.

Figures 22, 23:
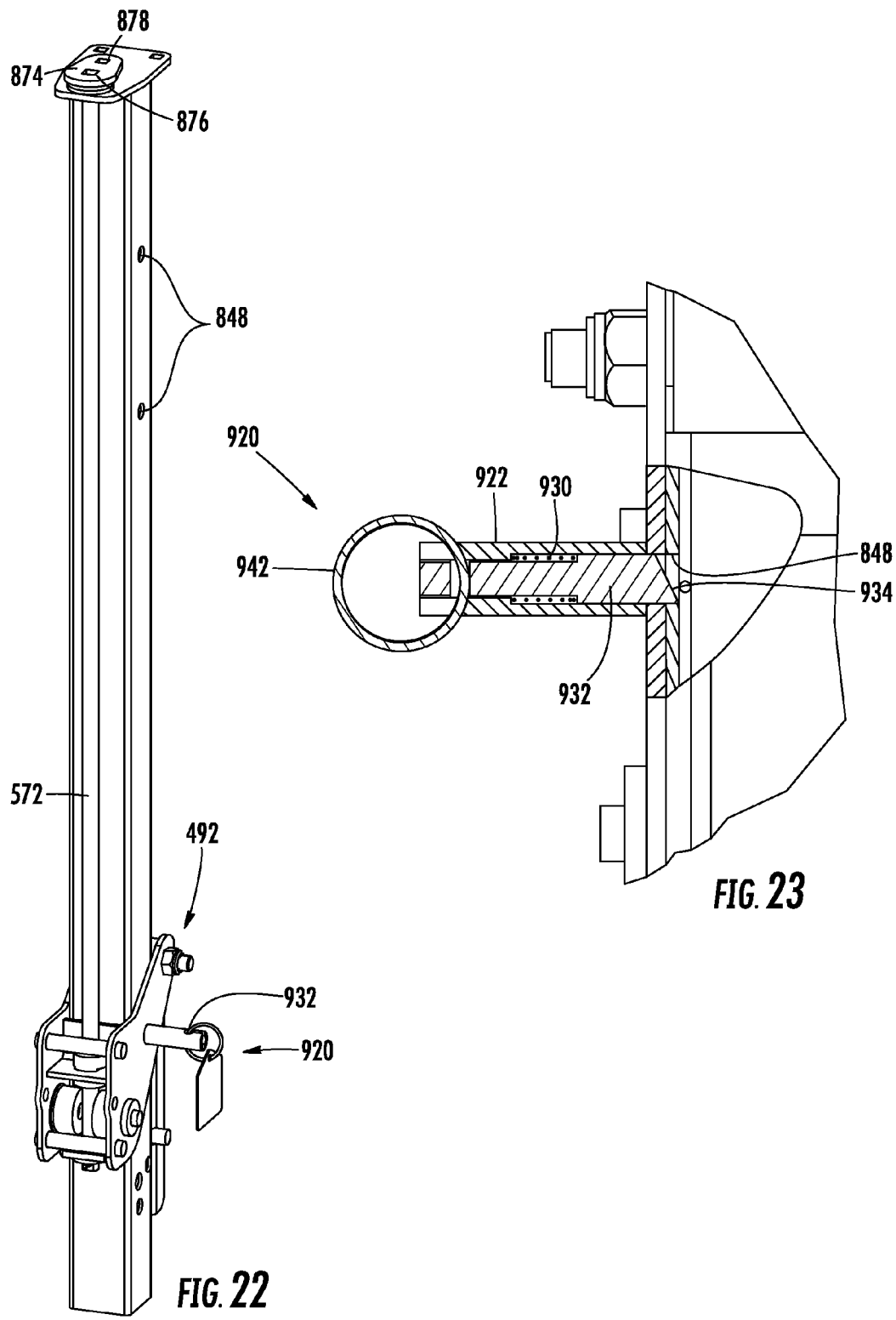
FIG. 22 is a front perspective view of the lifting frame support assembly.
FIG. 23 is a partial section view of the safety mechanism.
Figure 25:
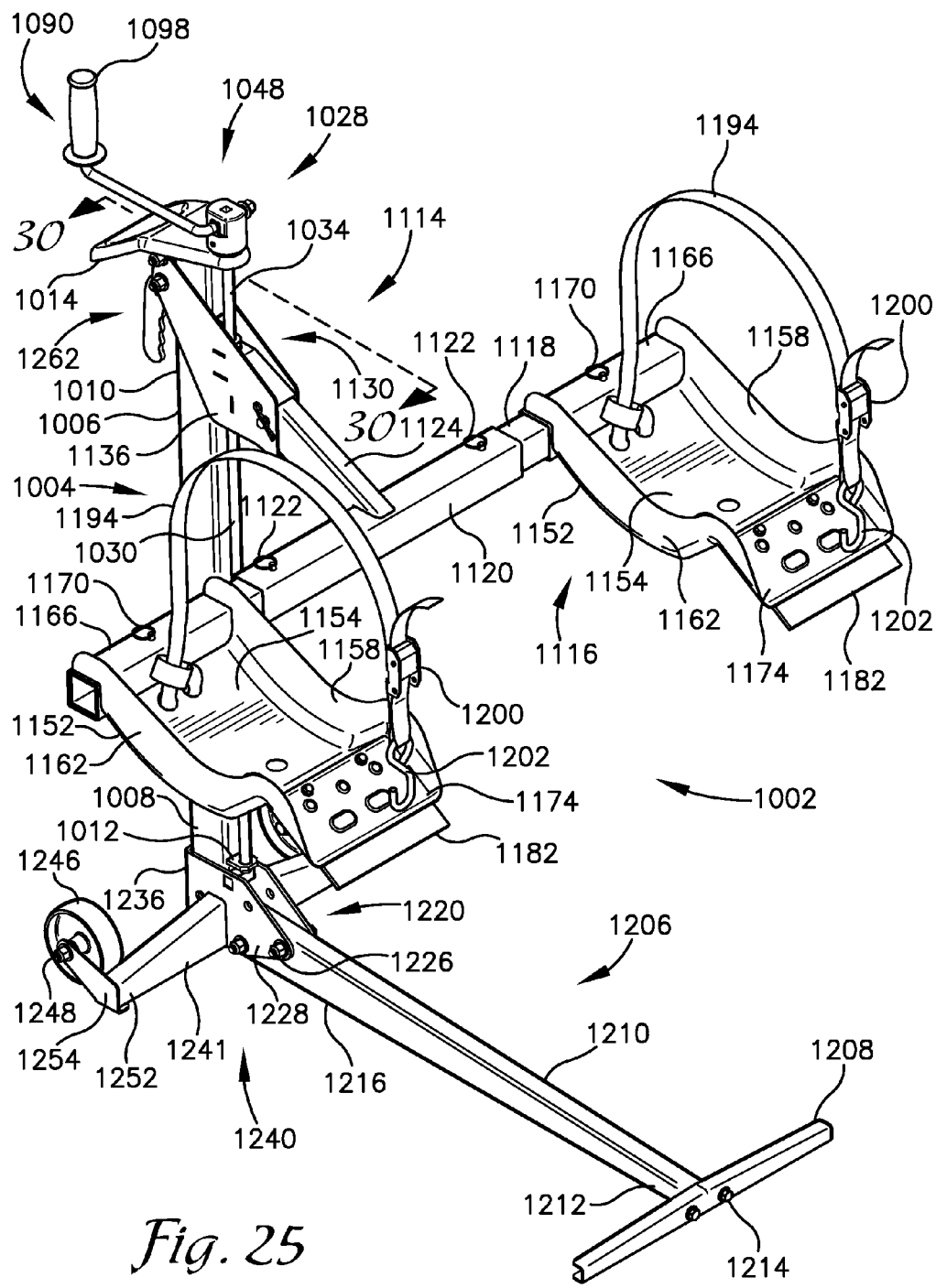
FIG. 25 is a front perspective view from above of an alternative embodiment vehicle jack embodying principles of the disclosed subject matter.
Figure 26:
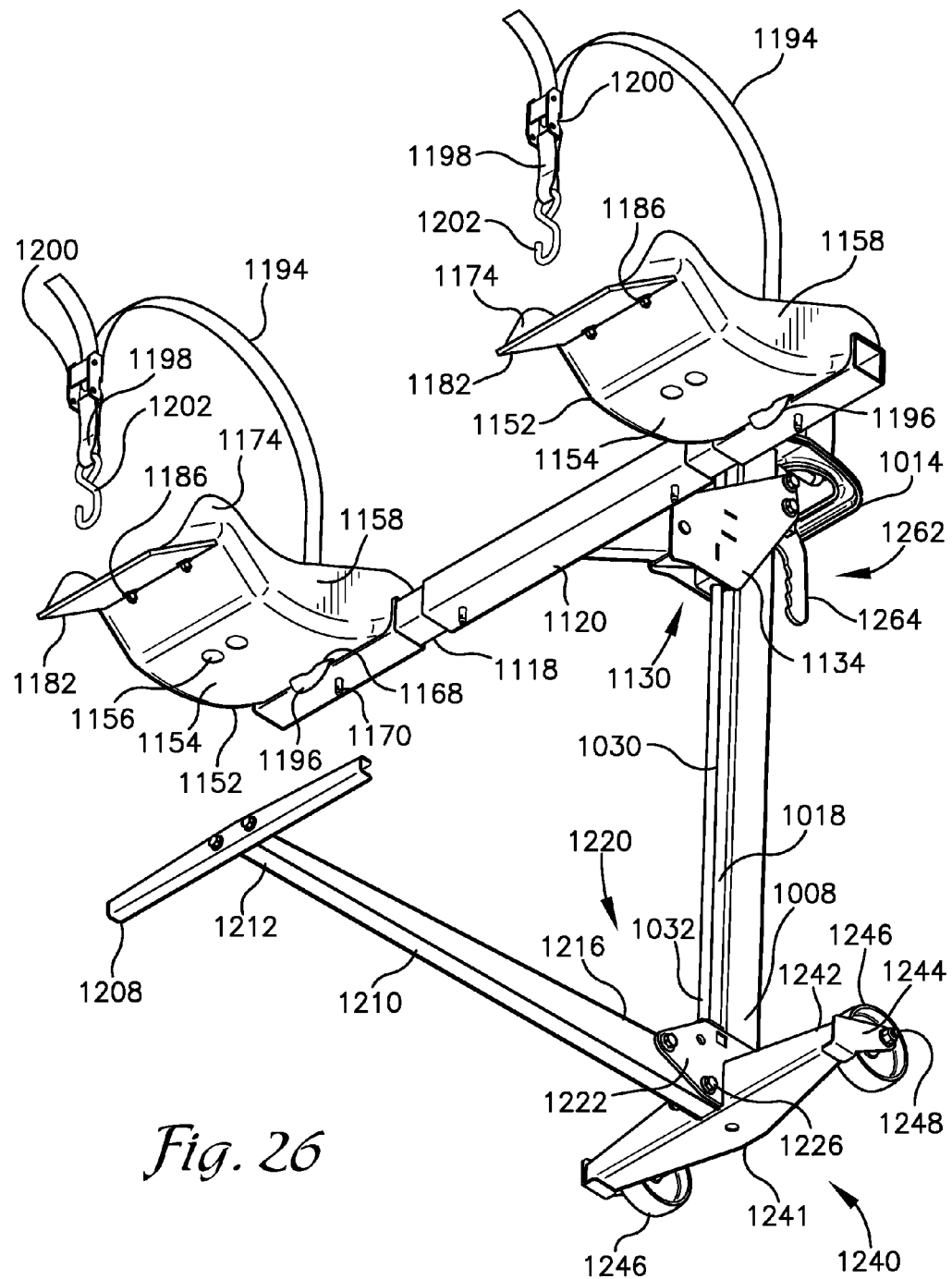
FIG. 26 is a front perspective view from below of the vehicle jack of FIG. 25.

Referring to FIGS. 22-23, in particular embodiments, the guide assembly 492 is provided with a safety mechanism 920 for preventing lowering of the wheel support 886. In various embodiments, the safety mechanism 920 is a pin 932 slidably received within a guide member 922. The guide member 922 is attached to the side of the guide assembly 492. A spring 930 biases the pin 932 into selective engagement with apertures 848 in the side surface of the elongated upright support. The pin 932 passes through an aperture in the side of the guide assembly and engages an aperture 848 in the side surface of the elongated upright support. As the handle 970 is turned in the take-up direction, the elongated support member 572 rotates which in turn causes the guide assembly 492 and wheel support assembly 886 to move upwardly. The pin 932 includes an angled, upwardly-facing interior end 934 that allows the pin 932 to slide out of, or disengage the apertures 848 as the guide assembly 492 travels upward. When the wheel support assembly 886 reaches the desired height, the guide assembly 492 is positioned to allow the pin 932 to engage an aperture 848 and upward travel of the guide assembly 492 may be ceased. Any downward movement of the guide assembly 492 is therefore prevented by the bottom portion of the interior end 934 engaging the bottom of the aperture 848. To lower the wheel support assembly 886, the pin 932 is pulled outward away from the aperture 848 against the biasing force of the spring using a ring 942 until the inward end of the pin 932 passes outward beyond an aperture 848.

In various embodiments, the vehicle jack 802 is provided with a handle 970 having a vertical portion connected to a horizontal portion. The horizontal portion includes a pair of pins 972 and a pair of apertures 974. The handle 970 is releasably mounted to the top of the elongated support member 572 by a nut and bolt combination 976. A top plate 874 having spaced apart first and second apertures 876, 878 is secured to the top of the elongated support member 572. The first aperture 876 is positioned over the elongated support member 572 providing a recess for one of the two pins 972. The second aperture 878 is spaced apart from the first aperture 876 and aligns with one of the apertures 974. A nut and bolt combination 976 is used to secure the handle 970 to the top plate 874 using apertures 974 and 876. When the pin 972 closest to the vertical portion engages the first aperture 876 the aperture 974 closest the vertical portion aligns with second aperture 878. When the pin 972 furthest from the vertical portion engages the first aperture 876 the aperture 974 furthest the vertical portion aligns with the second aperture 878. Providing a pair of pins 972 and apertures 974 in the handle 970 allow the user to adjust the position of the handle 970 on the vehicle jack 802, if need be, to avoid interference with its rotation due to part of the vehicle being in the way. In addition, if greater leverage for rotating the elongated support member 572 is desired the handle 970 can be connected to the top plate 874 using the pin 972 and aperture 974 furthest from the vertical portion.

In an embodiment, the elongated support member 572 can be rotated without the handle attached by adapting a motor, including an electric motor or electric drill, to engage the second aperture 878, wherein the second aperture 878 includes an interior sidewall having an angular conformation allowing a component to operably engage the second aperture 878 and rotate the elongated support member 572.

Alternative Screw Driven Embodiment

FIGS. 25-32 show an alternative embodiment vehicle jack 1002 embodying principles of the disclosed subject matter. In an embodiment, the vehicle jack 1002 generally comprises a wheel support assembly 1116 connected to a support frame assembly 1004 for engaging the wheels of a vehicle including a small tractor. In alternative embodiments, the wheel support assembly 1116 is connected to the support frame assembly 1004 by a lifting frame assembly 1114. In various alternative embodiments, the support frame assembly 1004 includes a lifting frame support assembly 1006 mounted adjacent a base assembly 1206, wherein the wheel support assembly 1116 is mounted adjacent the lifting frame support assembly 1006. The wheel support assembly 1116 is selectively raised and selectively lowered by a lifting frame actuation mechanism 1028.

Figure 32:
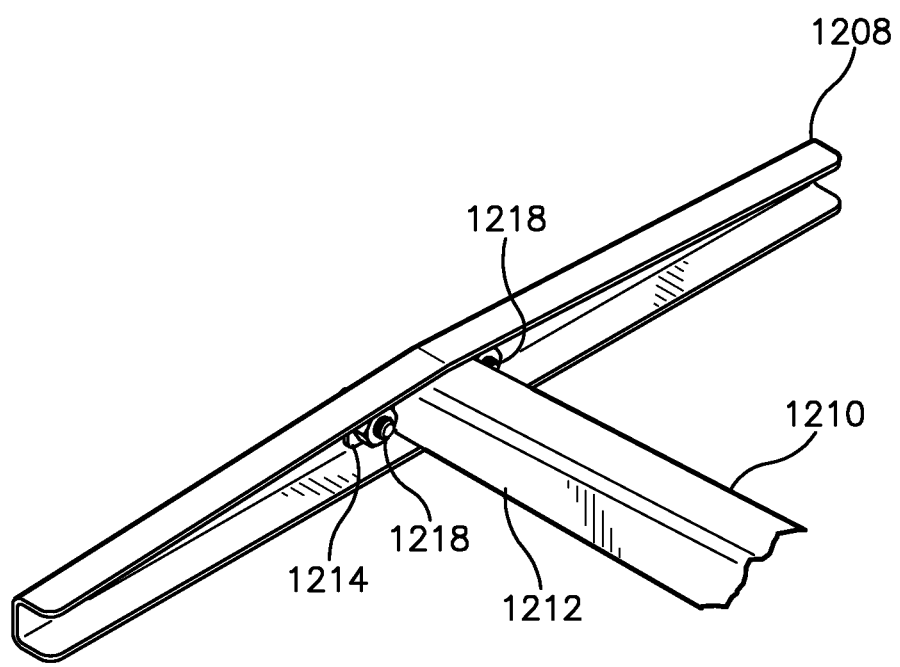
FIG. 32 is an enlarged view of the base.

The base assembly 1206 includes a central support 1210 with a front support 1208 at a front end 1212, and a rear support assembly 1240 at a rear end 1216. In an embodiment, the base assembly 1206 generally forms an I-shaped member. The front support 1208 is connected to the central support 1210 by suitable means including welding, or by a fastener 1218, including a nut and bolt combination that pass through tabs 1214 extending from either side of the front end 1212 (FIG. 32).

The rear support assembly 1240 is disposed opposite the front support 1208, and includes wheels 1246 attached to the back of a rear support 1241 for moving the vehicle jack 1002. The rear support assembly 1240 is connected to the central support 1210 by a bracket assembly 1220. The bracket assembly 1220 includes a first side plate 1222 and opposite second side plate 1228 joined by a rear plate 1236. The bracket assembly 1220 may be formed from the same piece of material or fastened together by suitable means, including welding. A pair of apertures in the first side plate 1222 align with a pair of corresponding apertures in the second side plate 1228. A pair of apertures in the rear end 1216 align with the aforementioned apertures in the bracket assembly 1220 allowing attachment of the central support 1210 thereto by a suitable means, including a fastener 1226 such as a nut and bolt combination, or welding.

A wheel 1246 is connected to the first end 1242 of the rear support 1241 by a first wheel bracket 1244, and a wheel 1246 is connected to the second end 1252 of the rear support 1241 by a second wheel bracket 1254. The brackets 1244 and 1254 are fastened to the rear support 1241 by suitable means, including welding. The wheels 1246 are attached at opposite ends of the rear support 1241 to their respective brackets by fasteners 1248, including a nut and bolt combination.

The lifting frame support assembly 1006 is a tubular member extending from a lower end 1008 to an upper end 1010. The lower end 1008 is received within the bracket assembly 1220 thereby generally orientating the lifting frame support assembly 1006 perpendicular to the base assembly 1206. A bracket 1012 attached to the front face 1018 of the lower end 1008 includes an aperture for rotatably receiving a lower end 1032 of an elongated support member 1030. The elongated support member 1030 is disposed opposite the front face 1018 parallel to the lifting frame support assembly 1006. An upper end 1034 of the elongated support member 1030 is rotatably received within an aperture 1016 of a mount or handle 1014 connected to the upper end 1010 of the lifting frame support assembly 1006. The handle 1014 is connected to the lifting frame support assembly 1006 by suitable means, including welding.

The wheel support assemblies 1116 are connected to the support frame assembly 1004 by the lifting frame assembly 1114. In the embodiment shown in FIGS. 25-27, each of a left and right wheel support assembly 1116 includes a bottom portion 1154 bound by: a first side portion 1158 and an opposite second side portion 1162; a front portion 1174 and an opposite rear portion 1166; thereby defining a body 1152. The bottom portion 1154 presents an upwardly open surface for receiving the wheel of a vehicle, with the first and second side portions 1158 and 1162 extending upward from the bottom portion 1154 with the body 1152 thereby generally forming an upwardly open support. An aperture 1168 at the rear of the bottom portion 1154 may be a drain hole, or receive a first end 1196 of a fastener 1194 or strap. An aperture 1156 at the front of the bottom portion 1154 may be a drain hole, or receive a second end 1198 of the fastener 1194. The first end 1196 of the fastener 1194 may be connected to the wheel support assembly 1116 by a loop, and the second end 1198 may be connected to the wheel support assembly 1116 by a hook 1202. A suitable fastener 1200, such as a buckle, may be used to allow adjustment of the length of the fastener 1194, thereby allowing an operator to circumscribe the wheel of the vehicle being elevated and secure the wheel to the wheel support assembly 1116.

In an embodiment, the rear portion 1166 defines a sleeve allowing the wheel support assembly 1116 to be mounted to a wheel support mounting bar 1118. In another embodiment, the wheel support assembly 1116 is secured directly to the wheel support mounting bar 1118. In another embodiment, the wheel support assembly 1116 is connected to a sleeve that is received on a wheel support mounting bar 1118, and is releasably secured thereto by suitable means, including a fastener 1170 or pin. The front portion 1174 presents a downwardly open surface for receiving a wear plate 1182. The generally rectangular wear plate 1182 is attached to the bottom of the front portion 1174 and is an optional replaceable wear component of the wheel support assembly 1116. The wear plate 1182 extends forward beyond the front portion 1174 providing contact with the ground, or contact with the surface supporting the wheeled vehicle to be elevated. The wear plate 1182 includes apertures for receiving fasteners 1186, including a nut and bolt combination, for releasably attaching the wear plate 1182 to the front portion 1174.

The wheel support mounting bar 1118 is slidably received within a central support 1120, and is releasably secured thereto by suitable means, including a fastener 1122 or pin. The distance between the wheel support assemblies 1116 may be adjusted by sliding them toward or away from each other about the central support 1120 or about the wheel support mounting bar 1118. A connector 1124 extending rearward from the central support 1120 is received by a guide assembly 1130.

Figure 27:
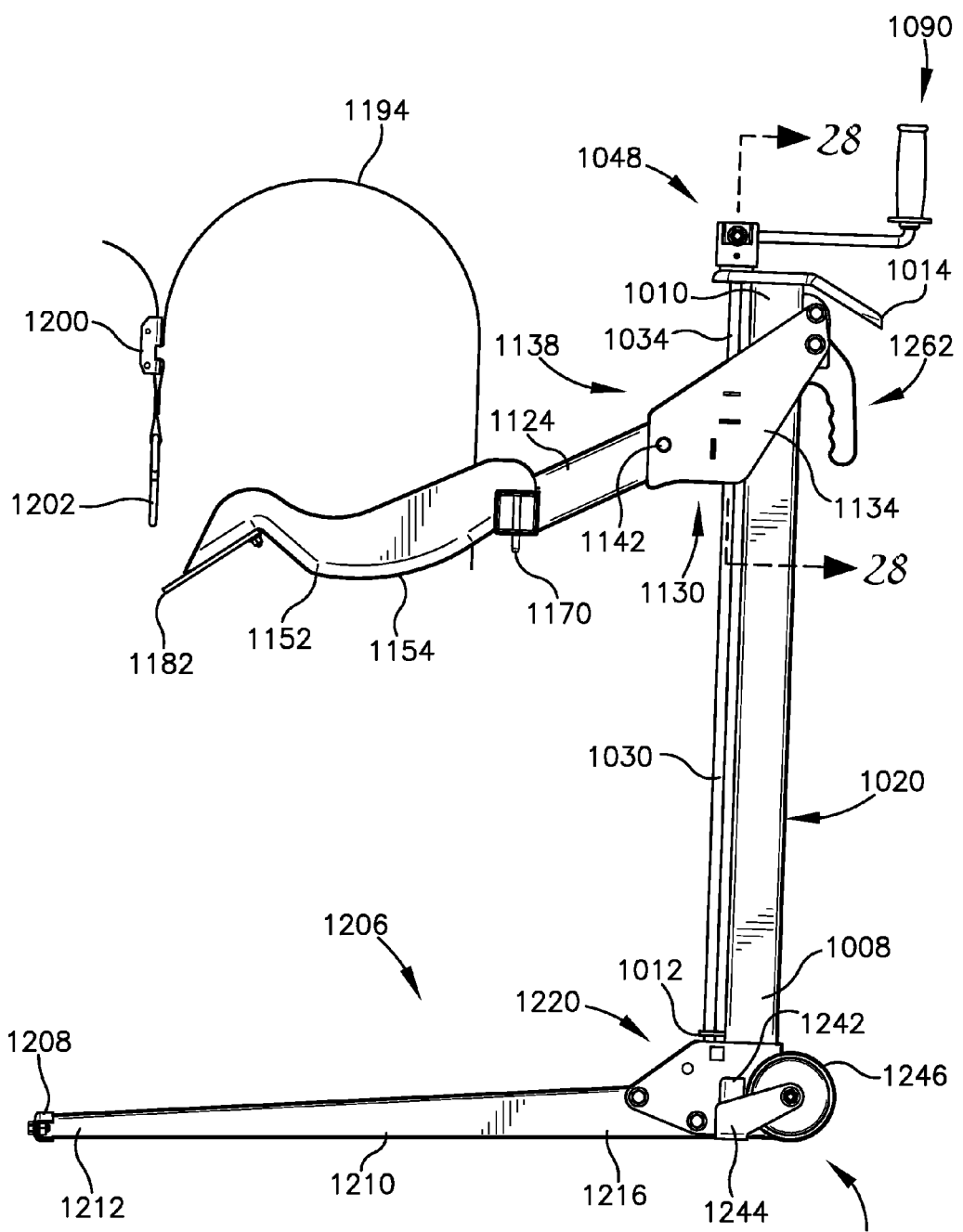
FIG. 27 is a side elevation view of the vehicle jack of FIG. 25.
Figure 28:
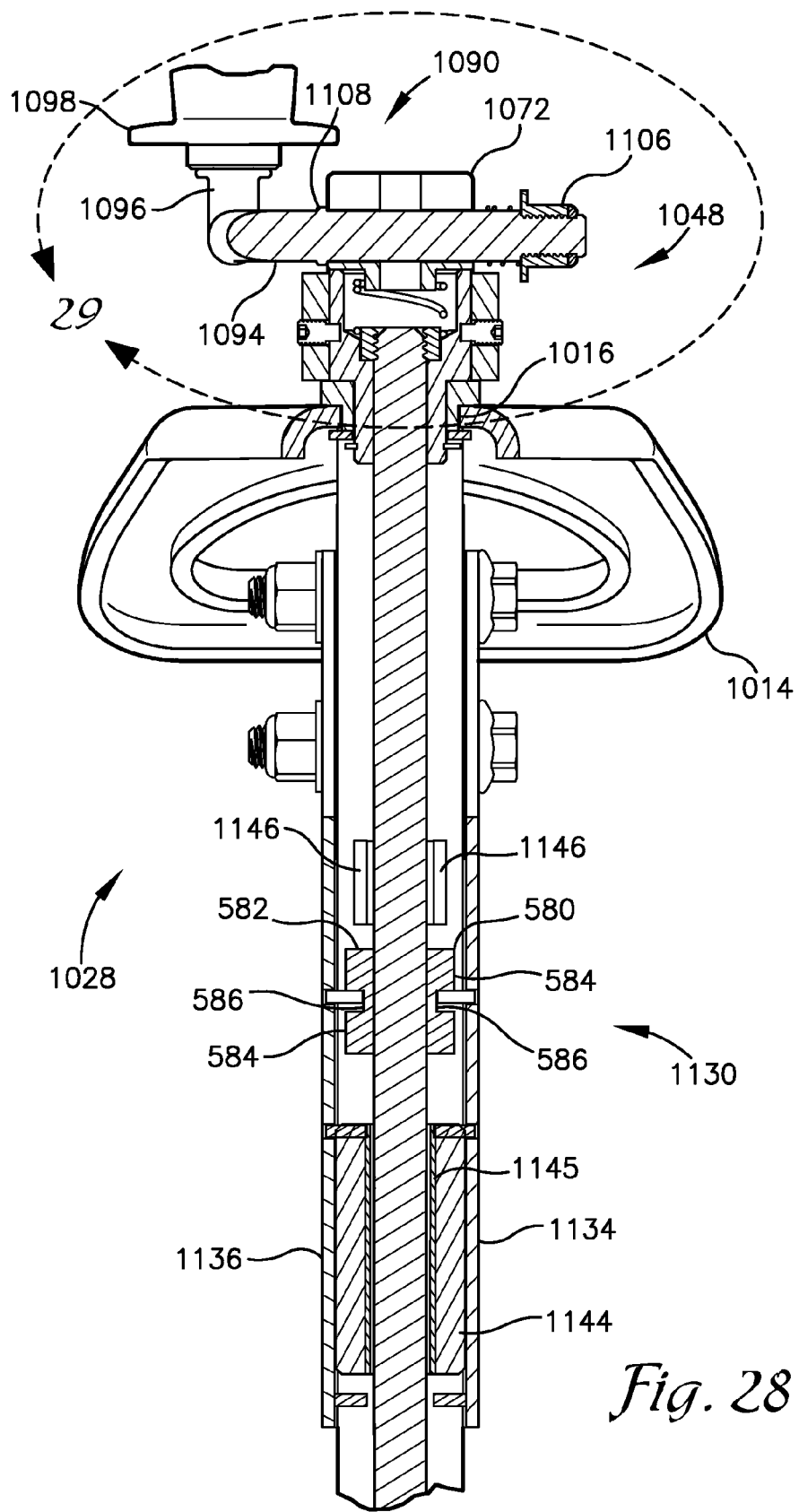
FIG. 28 is a section view of the guide assembly and clutch assembly taken along line 28-28 in FIG. 27.
Figure 29:
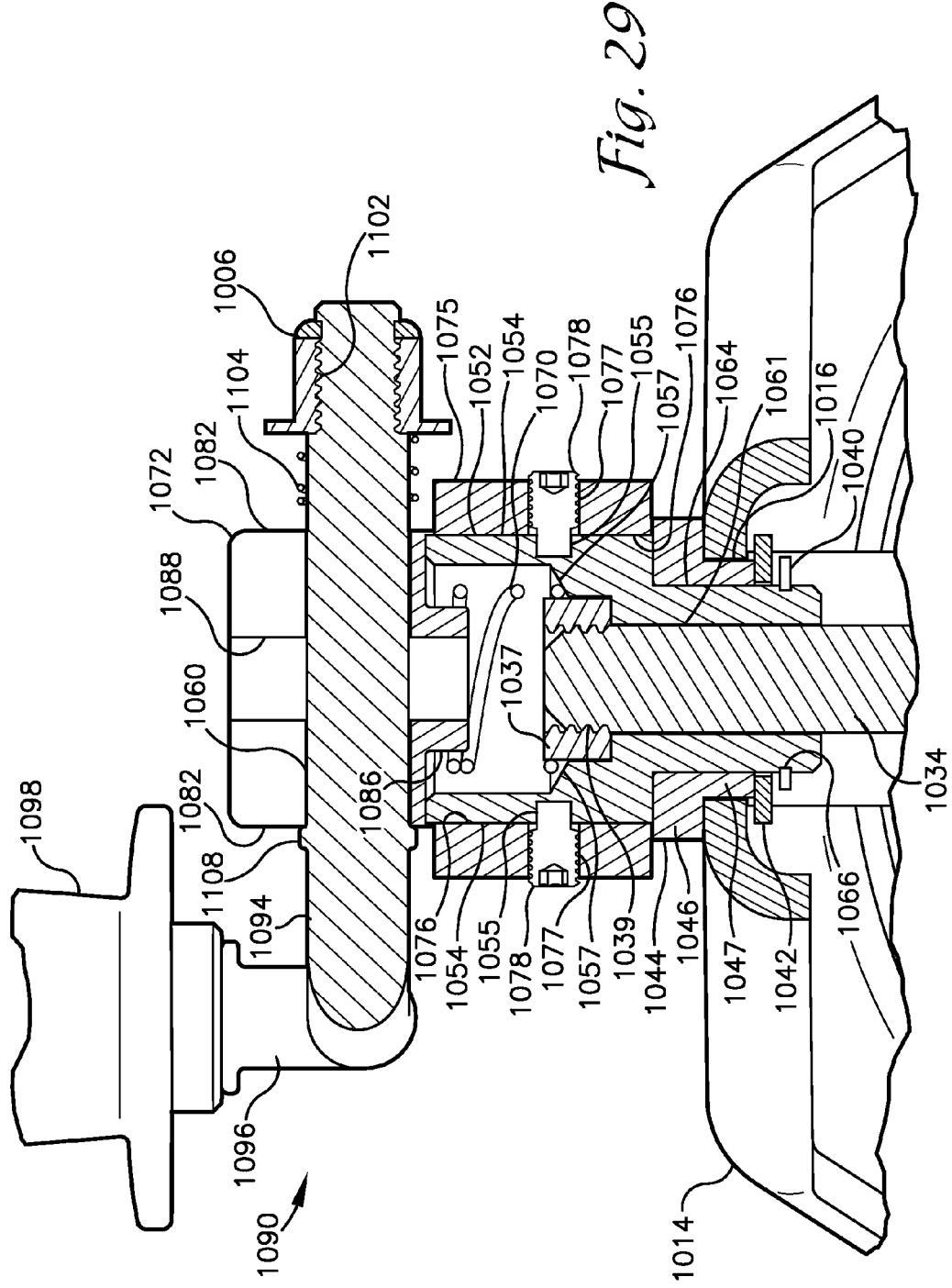
FIG. 29 is an enlarged view of the clutch assembly taken generally within circle 29 in FIG. 28.
Figure 30:
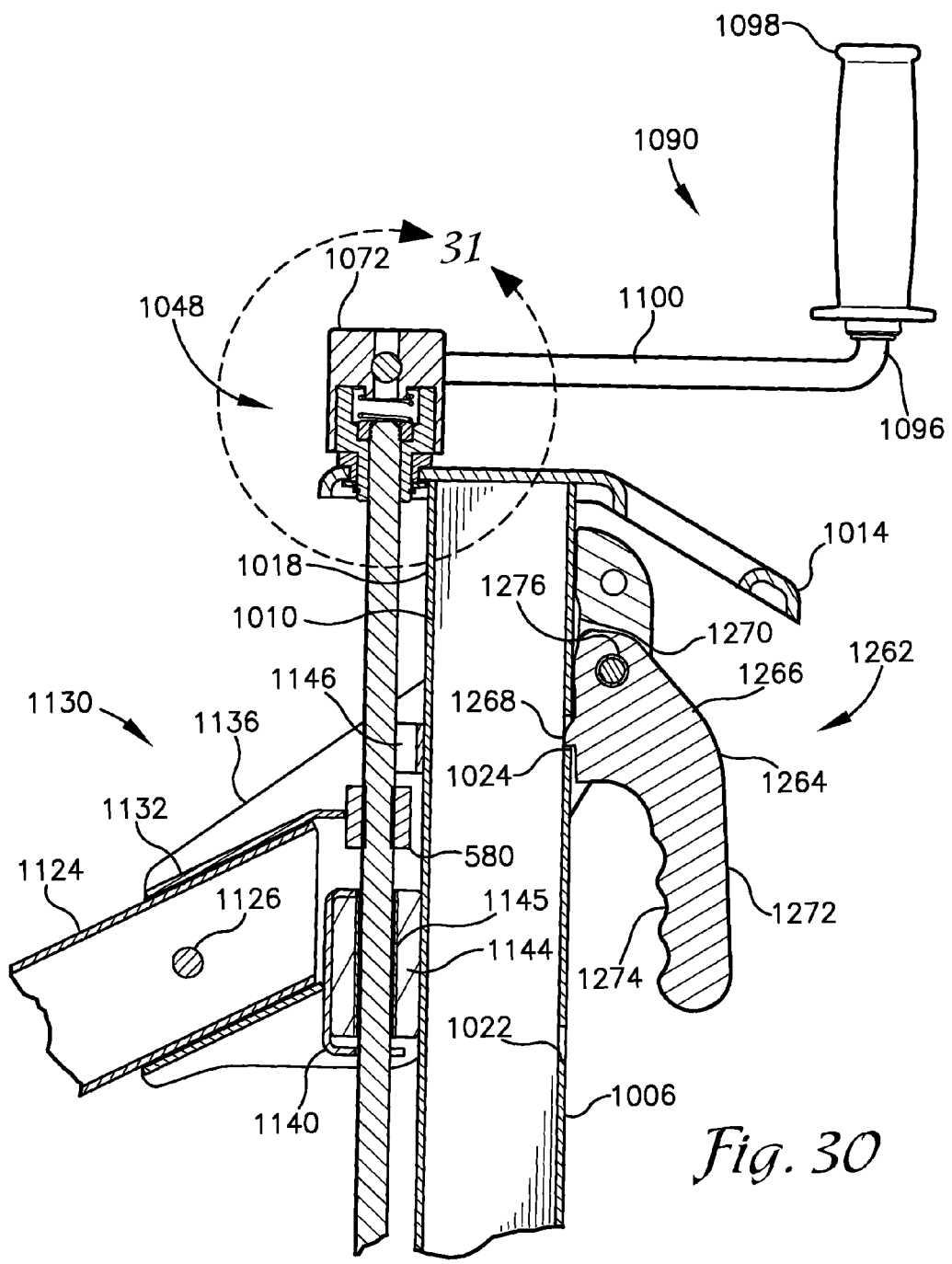
FIG. 30 is a section view of the guide assembly, clutch assembly, and catch assembly taken along line 30-30 in FIG. 25.
Figure 31:
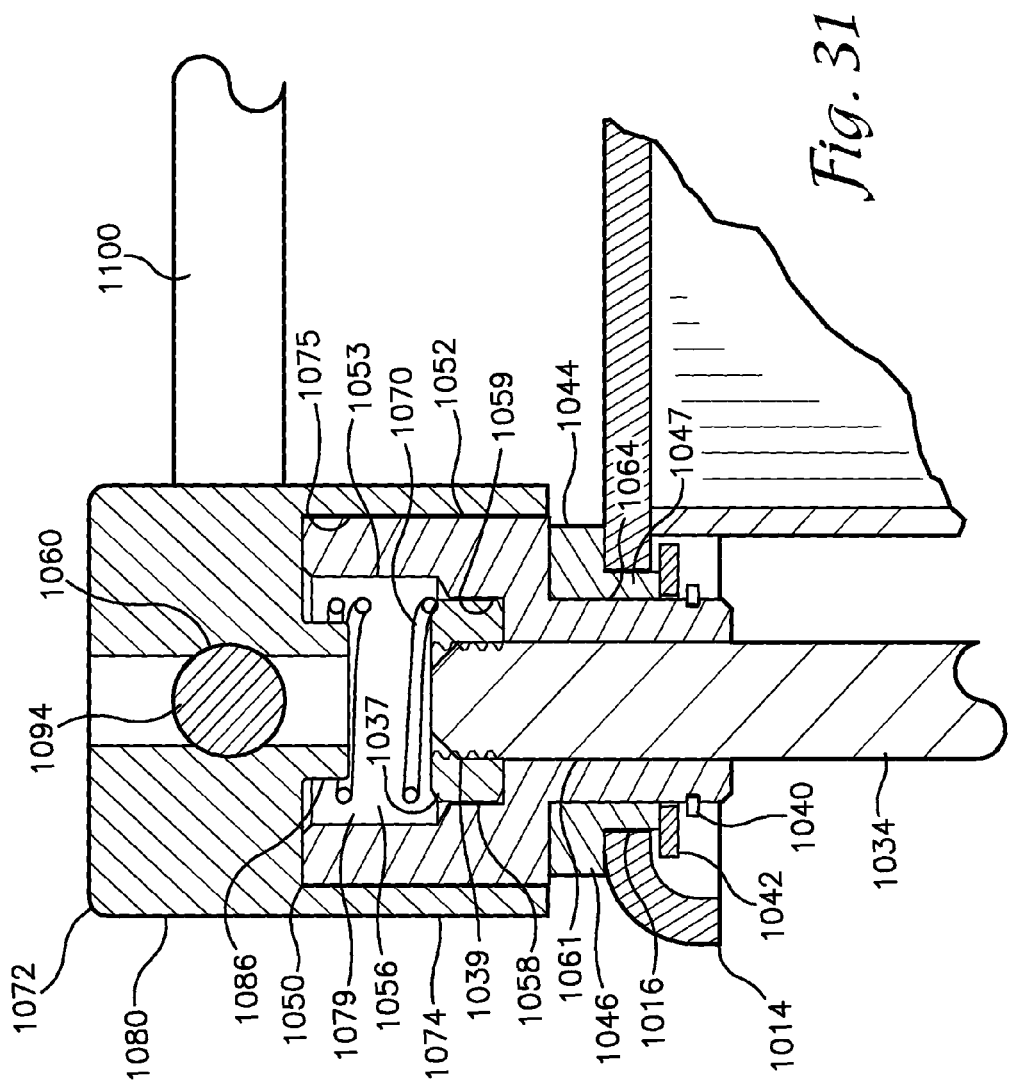
FIG. 31 is an enlarged view of the clutch assembly taken generally within circle 31 in FIG. 30.

Referring to FIGS. 27-28, 30, the guide assembly 1130 connects the lifting frame assembly 1114 to the lifting frame support assembly 1006. The guide assembly 1130 includes a first side plate 1134 and an opposite second side plate 1136 defining a bracket 1138 at the front for receiving an end of the connector 1124. An aperture 1142 in each side plate 1134 and 1136 align with an aperture 1126 at the back of the connector 1124. The apertures 1142 and 1126 are adapted to accept a fastener 1128, including a removable pin, thereby allowing the lifting frame assembly 1114 to be disconnected from the rest of the device for maintenance or storage of the device. The side plates 1134 and 1136 extend from the front of the lifting frame support assembly 1006 along the side of it to the rear of the lifting frame support assembly 1006. An upper guide bracket 1132 extends between the side plates 1134 and 1136 above the connector 1124, extending from the front portion of the side plates 1134 and 1136 toward the front face 1018, terminating with a rearward-facing U-shaped channel having two opposing and spaced apart interior side surfaces and an interior front surface, where the two opposing and spaced apart interior side surfaces are configured to engage the grooves 586 at the exterior of the threaded member 580. In particular embodiments, the interior front surface forms an arch between the interior side surfaces. A lower guide bracket 1140 having generally a C-shaped cross section extends between the side plates 1134 and 1136 below the upper guide bracket 1132 and toward the front face 1018, terminating in a rearward-facing upper U-shaped channel and a rearward-facing lower U-shaped channel for retaining a guide block 1144 there between. The elongated support member 1030 extends through a passage 1145 in the guide block and provides lateral support to the guide assembly 1130 as it travels along the lifting frame support assembly 1006.

The wheel support assembly 1116 is selectively raised and selectively lowered by an alternative embodiment lifting frame actuation mechanism 1028. The lifting frame actuation mechanism 1028 generally includes the elongated support member 1030 operable to raise and lower the guide assembly 1130, and in turn, the lifting frame assembly 1114, and a clutch assembly 1048 with a handle assembly 1090. In an embodiment, the exterior surface of the elongated support member 1030 defines threads extending between the lower end 1032 and an upper end 1034. Similarly, in certain embodiments, the interior surface of the threaded member 580 define threads that correspond with the threads of the elongated support member 1030 such that the threaded member 580 mateably engages the elongated support member 1030. In this manner, rotation of the elongated support member 1030 relative to the threaded member 580 results in travel of the threaded member 580 vertically along a length of the elongated support member 1030, thereby moving the guide assembly 1130 along the lifting frame support assembly 1006.

Referring to FIGS. 28-31, the clutch assembly 1048 is connected to the elongated support member 1030 at the upper end 1034, and generally includes a cup 1050 that interfaces with a receiver 1072. The cup 1050 includes a generally tubular upwardly-open upper portion 1052 forming a chamber extending upward from a tubular neck 1064. The upper portion 1052 includes a sidewall 1053 defining an upper chamber 1056 and a lower chamber 1058. The upper chamber 1056 has a circular interior wall, and a generally circular exterior wall with opposing flat sides 1054. An aperture 1055 within each side 1054 receives a fastener, including a set screw 1078 for securing the receiver 1072 to the cup 1050. A declining surface forms an angled transition 1057 between the lower end of the upper chamber 1056 and the upper end of the lower chamber 1058, wherein the lower chamber 1058 has a smaller diameter than the upper chamber 1056. The interior sidewall 1059 of the lower chamber is adapted for mateably engaging an element having a non-circular periphery, including a fastener with a hexagonal exterior surface. A passage 1061 extending vertically through the neck 1064 receives the upper end 1034 of the elongated support member 1030. The upper end 1034 includes threads 1039 for receiving a threaded fastener 1037, including a hexagonal nut for retaining the cup 1050 at the upper end 1034. The neck 1064 is rotably received within, and extends below, a circular bushing 1044. The bushing 1044 includes an outwardly extending flange 1046 at an upper end and a sleeve 1047 depending therefrom. The sleeve 1047 is received within the aperture 1016 in the handle 1014 with the flange 1046 resting on the top portion of the mount or handle 1014 providing a rotational surface supporting the upper portion 1052 from below. A washer 1042 is disposed below the sleeve and circumscribes the neck 1054. The lower end of the neck 1064 outer wall includes a groove 1066 for retaining a fastener including a snap ring 1040, with the snap ring 1040 retaining the washer 1042 below the handle 1014, thereby releasably retaining the cup 1050 on the handle 1014.

The receiver 1072 includes a generally tubular lower portion 1074 depending from a generally tubular upper portion 1080. The upper portion 1080 includes opposing flat sides 1082 at the exterior with a transverse aperture 1060 extending therethrough. A vertical aperture 1088 extends through the upper portion 1080 providing access to the lower portion 1074. The lower portion 1074 includes a sidewall 1075 defining a chamber 1079 where the interior of the sidewall 1075 includes opposing flat sides 1076. The sidewall 1075 extends over the exterior of the upper portion 1052 receiving the upper portion 1052 therein with a sidewall 1075 mateably engaging a side 1054. An aperture 1077 within each side 1076 receives a set screw 1078 for releasably connecting the cup 1050 to the receiver 1072. A projection 1086 extends downward from the upper portion 1080 into the chamber 1079 forming a guide for aligning a biasing member, including a helical spring 1070. An upper portion of the biasing member is in contact with the bottom wall of the upper portion 1080. A lower portion of the biasing member is received between the transition 1057 and the threaded fastener 1037.

In an embodiment, a rotational actuator is connected to the receiver 1072, including an electric motor, for rotating the elongated support member. In an embodiment, the rotational actuator is a handle assembly 1090 connected to the receiver 1072 allowing mechanical actuation of the elongated support member 1030 through engagement of the receiver 1072 with the cup 1050. In an alternative embodiment the receiver 1072 may be mechanically rotated by a power source, including an electric motor. The handle assembly 1090 includes a horizontal portion 1094 extending from a first end of a lateral portion 1100, and a vertical portion 1096 extending from a second end of the lateral portion 1100. The horizontal portion 1094 is received within an aperture 1060 extending transversely through the upper portion 1080. The distal end of the horizontal portion 1094 includes a threaded end 1102 receiving a threaded member 1106 for securing the handle assembly 1090 to the receiver 1072. Optionally the proximal end of the horizontal portion 1094 may include a protrusion 1108, and a spring 1104 may be disposed about the horizontal portion 1094 between the threaded member 1106 and receiver for biasing the protrusion 1108 against a receiver in the adjacent side 1082. The connection between the horizontal portion 1094 and the lateral portion 1100 is approximately a right angle. The connection between the vertical portion 1096 and the lateral portion 1100 is approximately a right angle, and the angle between the vertical portion 1096 and the horizontal portion 1094 is approximately a right angle. A grip 1098 may be attached to the vertical portion 1096 to aid in grasping the vertical portion 1096 when rotating the elongated support member 1030.

A catch assembly 1262 is connected to a rear portion of the guide assembly 1130. The catch assembly 1262 generally includes an engagement member 1264 that releasably engages the lifting frame support assembly 1006 preventing the wheel support assembly 1116 from moving downward. The engagement member 1264 includes an upper body 1266 with an aperture 1270 and a protrusion 1268. The rearward portions of the first side plate 1134 and second side plate 1136 form apertures (not shown) for receiving a tubular spacer 1276. The engagement member 1264 is mounted to the spacer 1276 by the aperture 1270 providing rotation thereabout, and may be centered using spacers. The protrusion 1268 extends from the forward edge of the upper body 1266. A lower body 1272 extends downward from the upper body 1266 forming a grip 1274 for grasping the engagement member with a hand.

In use, the clutch assembly 1048 prevents damage to the threads of the threaded member 580 or the threads of the elongated support member 1030, and the catch assembly 1262 arrests downward movement of the wheel support assembly 1116. Rotation of the elongated support member 1030 raises and lowers the wheel support assembly 1116. As the wheel support assembly 1116 is elevated it lifts the wheels of the engaged vehicle vertically, and the protrusion 1268 slidably engages apertures in the rear face 1020 of the lifting frame support assembly 1006, including the first aperture 1022 and the second aperture 1024. As the guide assembly 1130 advances toward the upper end 1010 the wheel support assembly 1116 reaches a predetermined height, and the top surface 582 contacts stops 1146 extending from the front face 1018. When the threaded member 580 engages the stops 1146, the vertical travel of the guide assembly 1130 and wheel support assembly 1116 is arrested. But for the clutch assembly 1048, further rotation of the elongated support member 1030 continues to draw the threaded member 580 toward the upper end 1010 and potentially causing damage to the threaded member 580 or elongated support member 1030.

In an embodiment the cup 1050 is manufactured from a softer material than the threaded fastener 1037 wherein further rotation of the clutch assembly 1048 about the upper end 1034 causes the threaded fastener 1037 to remain stationary as the threaded fastener 1037 rotates within the cup 1050 thereby rounding the interior sidewall 1059 and preventing rotation of the elongated support member 1030. Sacrificing the cup 1050 avoids damage to the threads of the threaded member 580 or the threads 1036 of the elongated support member 1030. In another embodiment the cup 1050 is manufactured from a softer material than the set screws 1078, and further rotation of the clutch assembly 1048 about the upper end 1034 causes the cup 1050 to remain stationary as the set screws 1078 rotates with the receiver 1072. In another embodiment the set screws 1078 are manufactured from a softer material than the cup 1050 and receiver 1072, and further rotation of the receiver 1072 about the upper end 1034 causes the set screws 1078 to shear as the receiver 1072 rotates about the cup 1050.

As the guide assembly 1130 moves downward, the lower edge of the protrusion 1268 engages the lower edge of the apertures 1022 and 1024 preventing downward movement of the wheel support assembly 1116 at those points of travel. As such, the lower body 1272 will be substantially parallel to the lifting frame support assembly 1006, providing a visual indication that the catch assembly 1262 is engaged. Grasping the lower body 1272 and moving the engagement member 1264 rearward removes the lower edge of the protrusion 1268 out of the path of the apertures allowing the guide assembly 1130 and the wheel support assembly 1116 to move downward. Because the lower body 1272 will no longer be substantially parallel to the lifting frame support assembly 1006, the lower body 1272 provides a visual indication that the catch assembly 1262 is disengaged. Although two apertures are shown in the rear of the lifting frame support assembly 1006, a plurality of apertures may be spaced at varying distances along the support assembly 1006 for arresting downward movement of the wheel support assembly 1116 and the supported vehicle, thereby providing varying working heights.

Many modifications and other embodiments of the disclosed subject matter set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Having thus described the disclosed subject matter, what is claimed as new and desired to be secured by Letters Patent is:

1. A clutch assembly, comprising:
   a cup assembly including a generally tubular upwardly-open chamber including a generally circular exterior sidewall with opposing exterior flat sides;
   a receiver assembly, comprising a generally tubular downwardly-open chamber including a generally circular interior sidewall with opposing interior flat sides;
   wherein the cup flat exterior sidewall engages the receiver flat interior sidewall; and
   a threaded member received within the receiver sidewall and engaging the flat sides of the cup sidewall.

2. The clutch assembly of claim 1, wherein the upwardly-open chamber further comprises:
   an upper chamber; and
   a lower chamber having a non-circular interior side wall adapted for mateably engaging an element having a non-circular periphery.

3. The clutch assembly of claim 2, further comprising:
   a tubular neck depending from the lower chamber;
   a passage extending from the lower chamber through the tubular neck;
   an elongated support member extending from a first end to a second end, the first end received by the passage; and
   wherein the element includes a threaded fastener threadably received on the first end of the elongated support member.

4. The clutch assembly of claim 3, further comprising:
a mount including an aperture; and
a bushing receiving the tubular neck where the bushing separates the cup assembly from the aperture of the mount.

5. The clutch assembly of claim 4, wherein the bushing further includes:
an upper end;
a flange extending outward from the upper end;
a sleeve depending from the upper end wherein the flange supports the cup upper chamber from below.

6. The clutch assembly of claim 4, further comprising a fastener secured to the neck below the mount for retaining the cup assembly on the mount.

7. The clutch assembly of claim 4, further comprising:
a transition between the upper chamber and the cup lower chamber wherein the lower chamber has a smaller diameter than the upper chamber.

8. The clutch assembly of claim 3, wherein the threaded fastener has a non-circular peripheral edge engaging the lower chamber interior sidewall.

9. The clutch assembly of claim 2, further comprising a biasing member disposed between the cup assembly and the receiver assembly for biasing the element into the lower chamber.

10. A clutch assembly, comprising:
a cup assembly including a generally tubular upwardly-open chamber, comprising:
a generally circular exterior sidewall with opposing exterior flat sides;
a non-circular interior sidewall; and
a bottom wall;
a receiver assembly, comprising a generally tubular downwardly-open chamber including a generally circular interior sidewall with opposing interior flat sides; and
wherein the cup flat exterior sidewall engages the receiver flat interior sidewall.

11. The clutch assembly of claim 10, further comprising a passage extending through the cup assembly bottom wall.

12. The clutch assembly of claim 11, further comprising a threaded member received within the receiver sidewall and engaging the flat sides of the cup sidewall.

13. The clutch assembly of claim 10, wherein:
the upwardly-open chamber includes a lower chamber; and
wherein the non-circular interior sidewall is disposed within the lower chamber.

14. The clutch assembly of claim 13, wherein:
the upwardly-open chamber further includes an upper chamber above the lower chamber; and
a transition between the upper chamber and the lower chamber wherein the lower chamber has a smaller diameter than the upper chamber.

15. The clutch assembly of claim 10, wherein the receiver assembly comprises an upper portion and a lower portion, wherein the downwardly-open chamber depends from the upper portion.

16. The clutch assembly of claim 15, further comprising a projection depending from the upper portion disposed within the downwardly-open chamber.

17. The clutch assembly of claim 16, further comprising a biasing member disposed between the receiver upper portion and cup bottom wall.

18. The clutch assembly of claim 10, further comprising:
a tubular neck depending from the cup bottom wall; and
a passage extending from the bottom wall through the tubular neck for receiving an elongated support member.

19. The clutch assembly of claim 18, further comprising an element connected to an end of the elongated support member, wherein the element is received by the cup non-circular interior sidewall.

20. A clutch assembly, comprising:
a cup assembly including a generally tubular upwardly-open chamber including a generally circular exterior sidewall with opposing exterior flat sides, comprising:
an upper chamber; and
a lower chamber having a non-circular interior side wall adapted for mateably engaging an element having a non-circular periphery;
a receiver assembly, comprising a generally tubular downwardly-open chamber including a generally circular interior sidewall with opposing interior flat sides; and
wherein the cup flat exterior sidewall engages the receiver flat interior sidewall.

21. The clutch assembly of claim 20, further comprising:
a tubular neck depending from the lower chamber;
a passage extending from the lower chamber through the tubular neck;
an elongated support member extending from a first end to a second end, the first end received by the passage; and
wherein the element includes a threaded fastener threadably received on the first end of the elongated support member.

22. The clutch assembly of claim 21, further comprising:
a mount including an aperture; and
a bushing receiving the tubular neck where the bushing separates the cup assembly from the aperture of the mount.

23. The clutch assembly of claim 22, wherein the bushing further includes:
an upper end;
a flange extending outward from the upper end;
a sleeve depending from the upper end wherein the flange supports the cup upper chamber from below.

24. The clutch assembly of claim 22, further comprising a fastener secured to the neck below the mount for retaining the cup assembly on the mount.

25. The clutch assembly of claim 22, further comprising:
a transition between the upper chamber and the cup lower chamber wherein the lower chamber has a smaller diameter than the upper chamber.

26. The clutch assembly of claim 21, wherein the fastener has a non-circular peripheral edge engaging the lower chamber interior sidewall.

27. The clutch assembly of claim 20, further comprising a biasing member disposed between the cup assembly and the receiver assembly for biasing the element into the lower chamber.

28. The clutch assembly of claim 20, further comprising a threaded member received within the receiver sidewall and engaging the flat sides of the cup sidewall.

* * * * *